(12) United States Patent
Sasagawa

(10) Patent No.: US 11,762,727 B2
(45) Date of Patent: Sep. 19, 2023

(54) INFORMATION PROCESSING APPARATUS AND METHOD OF MONITORING OPERATION

(71) Applicant: FUJITSU LIMITED, Kawasaki (JP)

(72) Inventor: Ryuhei Sasagawa, Koto (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/726,695

(22) Filed: Apr. 22, 2022

(65) Prior Publication Data
US 2022/0413955 A1 Dec. 29, 2022

(30) Foreign Application Priority Data
Jun. 25, 2021 (JP) ................................. 2021-105423

(51) Int. Cl.
*G06F 11/07* (2006.01)
(52) U.S. Cl.
CPC .......... *G06F 11/079* (2013.01); *G06F 11/073* (2013.01)
(58) Field of Classification Search
CPC ............................. G06F 11/079; G06F 11/073
See application file for complete search history.

(56) References Cited

U.S. PATENT DOCUMENTS

| 9,632,888 B2 * | 4/2017 | Sun ......................... G06F 13/00 |
| 2005/0015685 A1 * | 1/2005 | Yamamoto ............ H04L 41/065 |
| | | 714/E11.026 |

FOREIGN PATENT DOCUMENTS

| JP | 2005-025483 A | 1/2005 |
| JP | 2011-180673 A | 9/2011 |
| JP | 2013-191026 A | 9/2013 |

* cited by examiner

*Primary Examiner* — Nadeem Iqbal
(74) *Attorney, Agent, or Firm* — ArentFox Schiff LLP

(57) ABSTRACT

An information processing apparatus includes a processor configured to acquire first information that indicates a correspondence relationship between a virtual identifier of a memory device and a first identifier of a slot to which the memory device is attached, acquire second information that indicates a correspondence relationship between a second identifier of a slot to which the memory device is attached and a state of the memory device, generate correspondence information that indicates a correspondence relationship among the virtual identifier, the first identifier, and the second identifier based on the first information and the second information, acquire, during an operation of the distributed storage, third information that indicates correspondence relationship between the virtual identifier and the first identifier and fourth information that indicates correspondence relationship between the second identifier and the state of the memory device, and update the correspondence information based on the third information and the fourth information.

12 Claims, 39 Drawing Sheets

| SOFTWARE ||
|---|---|
| ID | SAS NUMBER (SOFTWARE) |
| 0 | SAS-xxxx-scsi-aaaa |
| 1 | SAS-xxxx-scsi-bbbb |
| 2 | SAS-xxxx-scsi-cccc |
| 3 | SAS-xxxx-scsi-dddd |
| 4 | SAS-xxxx-scsi-eeee |
| 5 | SAS-xxxx-scsi-ffff |
| 6 | SAS-xxxx-scsi-gggg |
| 7 | SAS-xxxx-scsi-hhhh |

| HARDWARE ||
|---|---|
| SAS NUMBER (HARDWARE) | STATE |
| PPPP | Operational |
| QQQQ | Operational |
| RRRR | Operational |
| SSSS | Operational |
| TTTT | Operational |
| UUUU | Operational |
| VVVV | Operational |
| WWWW | Operational |

FIG. 6

SOFTWARE/HARDWARE CORRESPONDENCE TABLE ~600

| | SOFTWARE | | HARDWARE | | FAILURE STATE | | IDENTIFICATION |
|---|---|---|---|---|---|---|---|
| ID | SAS NUMBER (SOFTWARE) | SAS NUMBER (HARDWARE) | STATE | SOFTWARE | HARDWARE | |
| 0 | SAS-xxxx-scsi-aaaa | PPPP | Operational | ○ | ○ | – |
| 1 | SAS-xxxx-scsi-bbbb | QQQQ | Operational | ○ | ○ | – |
| 2 | SAS-xxxx-scsi-cccc | RRRR | Operational | ○ | ○ | – |
| 3 | SAS-xxxx-scsi-dddd | SSSS | Operational | ○ | ○ | – |
| 4 | SAS-xxxx-scsi-eeee | TTTT | Operational | ○ | ○ | – |
| 5 | SAS-xxxx-scsi-ffff | UUUU | Operational | ○ | ○ | – |
| 6 | SAS-xxxx-scsi-gggg | VVVV | Operational | ○ | ○ | – |
| 7 | SAS-xxxx-scsi-hhhh | WWWW | Operational | ○ | ○ | – |

| ID | DEVICE NAME |
|----|-------------|
| 0  | /dev/sd0    |
| 1  | /dev/sda    |
| 2  | /dev/sdb    |
| 3  | /dev/sdc    |
| 4  | /dev/sdd    |
| 5  | /dev/sde    |
| 6  | /dev/sdf    |
| 7  | /dev/sdg    |

| DEVICE NAME | SAS NUMBER (SOFTWARE) |
|---|---|
| /dev/sd0 | SAS-xxxx-scsi-aaaa |
| /dev/sda | SAS-xxxx-scsi-bbbb |
| /dev/sdb | SAS-xxxx-scsi-cccc |
| /dev/sdc | SAS-xxxx-scsi-dddd |
| /dev/sdd | SAS-xxxx-scsi-eeee |
| /dev/sde | SAS-xxxx-scsi-ffff |
| /dev/sdf | SAS-xxxx-scsi-gggg |
| /dev/sdg | SAS-xxxx-scsi-hhhh |

FIG. 10

| ID | DEVICE NAME |
|---|---|
| 0 | /dev/sd0 |
| 1 | /dev/sda |
| 3 | /dev/sdc |
| 4 | /dev/sdd |
| 5 | /dev/sde |
| 6 | /dev/sdf |
| 7 | /dev/sdg |

| DEVICE NAME | SAS NUMBER (SOFTWARE) |
|---|---|
| /dev/sd0 | SAS-xxxx-scsi-aaaa |
| /dev/sda | SAS-xxxx-scsi-bbbb |
| /dev/sdc | SAS-xxxx-scsi-dddd |
| /dev/sdd | SAS-xxxx-scsi-eeee |
| /dev/sde | SAS-xxxx-scsi-ffff |
| /dev/sdf | SAS-xxxx-scsi-gggg |
| /dev/sdg | SAS-xxxx-scsi-hhhh |

FIG. 12

| TYPE | FAILURE STATE | | EXPRESSION MODE IN LOG | |
|---|---|---|---|---|
| | SOFTWARE | HARDWARE | SOFTWARE | HARDWARE |
| A | ○ | ○ | SHOWN | "Operational" |
| B | ○ | × | SHOWN | HIDDEN |
| C | × | ○ | HIDDEN | "Available" |
| D | × | × | HIDDEN | HIDDEN |

FIG. 13

| | NUMBER OF HDD FAILURES FOR EACH FAILURE TYPE (MEASURES TO BE TAKEN) | | | MAINTENANCE PROCEDURE |
|---|---|---|---|---|
| | NB<br>B: HDD EXCHANGE | NC<br>C: SOFTWARE RECOVERY | ND<br>D: HDD EXCHANGE | |
| 1 | 1 | 1 | 0 | ONE TIME (SOFTWARE RECOVERY × 1, HDD EXCHANGE × 1) |
| 2 | 1 | 0 | 1 | ONE TIME (HDD EXCHANGE × 2) |
| 3 | 0 | 1 | 1 | TWO TIMES (HDD EXCHANGE × 1 => SOFTWARE RECOVERY × 1) |
| 4 | 2 | 0 | 0 | ONE TIME (HDD EXCHANGE × 2) |
| 5 | 0 | 2 | 0 | ONE TIME (SOFTWARE RECOVERY × 2) |
| 6 | 0 | 0 | 2 | ONE TIME (HDD EXCHANGE × 2) |
| 7 | 1 | 1 | 1 | TWO TIMES (HDD EXCHANGE × 2 => SOFTWARE RECOVERY × 1) |
| ... | ... | ... | ... | ... |

| SOFTWARE | |
|---|---|
| ID | SAS NUMBER (SOFTWARE) |
| 0 | SAS-xxxx-scsi-aaaa |
| 1 | SAS-xxxx-scsi-bbbb |
| 3 | SAS-xxxx-scsi-dddd |
| 4 | SAS-xxxx-scsi-eeee |
| 5 | SAS-xxxx-scsi-fffff |
| 6 | SAS-xxxx-scsi-gggg |
| 7 | SAS-xxxx-scsi-hhhh |

1402

| HARDWARE | |
|---|---|
| SAS NUMBER (HARDWARE) | STATE |
| PPPP | Operational |
| QQQQ | Operational |
| RRRR | Operational |
| SSSS | Operational |
| TTTT | Operational |
| VVVV | Operational |
| WWWW | Operational |

FIG. 15

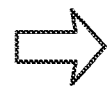

SOFTWARE/HARDWARE CORRESPONDENCE TABLE (TEMPORARY) ~600

| ID | SOFTWARE | HARDWARE | | FAILURE STATE | | IDENTIFICATION |
|---|---|---|---|---|---|---|
| | SAS NUMBER (SOFTWARE) | SAS NUMBER (HARDWARE) | STATE | SOFTWARE | HARDWARE | |
| 0 | SAS-xxxx-scsi-aaaa | PPPP | Operational | ○ | ○ | — |
| 1 | SAS-xxxx-scsi-bbbb | QQQQ | Operational | ○ | ○ | — |
| 2 | SAS-xxxx-scsi-cccc | RRRR | Operational | × | ○ | — |
| 3 | SAS-xxxx-scsi-dddd | SSSS | Operational | ○ | ○ | — |
| 4 | SAS-xxxx-scsi-eeee | TTTT | Operational | ○ | ○ | — |
| 5 | SAS-xxxx-scsi-ffff | UUUU | — | ○ | × | — |
| 6 | SAS-xxxx-scsi-gggg | VVVV | Operational | ○ | ○ | — |
| 7 | SAS-xxxx-scsi-hhhh | WWWW | Operational | ○ | ○ | — |

FIG. 16

SOFTWARE/HARDWARE CORRESPONDENCE TABLE (UPDATED) ~600

| ID | SOFTWARE | HARDWARE | | FAILURE STATE | | IDENTIFICATION |
| | SAS NUMBER (SOFTWARE) | SAS NUMBER (HARDWARE) | STATE | SOFTWARE | HARDWARE | |
| --- | --- | --- | --- | --- | --- | --- |
| 0 | SAS-xxxx-scsi-aaaa | PPPP | Operational | ○ | ○ | — |
| 1 | SAS-xxxx-scsi-bbbb | QQQQ | Operational | ○ | ○ | — |
| 2 | SAS-xxxx-scsi-cccc | UUUU | — | × | × | D |
| 3 | SAS-xxxx-scsi-dddd | SSSS | Operational | ○ | ○ | — |
| 4 | SAS-xxxx-scsi-eeee | TTTT | Operational | ○ | ○ | — |
| 5 | SAS-xxxx-scsi-ffff | RRRR | Operational | ○ | ○ | — |
| 6 | SAS-xxxx-scsi-gggg | VVVV | Operational | ○ | ○ | — |
| 7 | SAS-xxxx-scsi-hhhh | WWWW | Operational | ○ | ○ | — |

| ID | SOFTWARE SAS NUMBER (SOFTWARE) |
|---|---|
| 0 | SAS-xxxx-scsi-aaaa |
| 1 | SAS-xxxx-scsi-bbbb |
| 3 | SAS-xxxx-scsi-dddd |
| 4 | SAS-xxxx-scsi-eeee |
| 5 | SAS-xxxx-scsi-ffff |
| 6 | SAS-xxxx-scsi-gggg |
| 7 | SAS-xxxx-scsi-hhhh |

1702

| HARDWARE SAS NUMBER (HARDWARE) | STATE |
|---|---|
| PPPP | Operational |
| QQQQ | Operational |
| RRRR | Operational |
| SSSS | Operational |
| TTTT | Operational |
| UUUU | Available |
| VVVV | Operational |
| WWWW | Operational |

FIG. 18

SOFTWARE/HARDWARE CORRESPONDENCE TABLE (TEMPORARY) ~600

| ID | SOFTWARE | HARDWARE | | | FAILURE STATE | | IDENTIFICATION |
|---|---|---|---|---|---|---|---|
| | SAS NUMBER (SOFTWARE) | SAS NUMBER (HARDWARE) | STATE | | SOFTWARE | HARDWARE | |
| 0 | SAS-xxxx-scsi-aaaa | PPPP | Operational | | ○ | ○ | - |
| 1 | SAS-xxxx-scsi-bbbb | QQQQ | Operational | | ○ | ○ | - |
| 2 | SAS-xxxx-scsi-cccc | RRRR | Operational | | × | ○ | - |
| 3 | SAS-xxxx-scsi-dddd | SSSS | Operational | | ○ | ○ | - |
| 4 | SAS-xxxx-scsi-eeee | TTTT | Operational | | ○ | ○ | - |
| 5 | SAS-xxxx-scsi-ffff | UUUU | Available | | ○ | ○ | - |
| 6 | SAS-xxxx-scsi-gggg | VVVV | Operational | | ○ | ○ | - |
| 7 | SAS-xxxx-scsi-hhhh | WWWW | Operational | | ○ | ○ | - |

FIG. 19

SOFTWARE/HARDWARE CORRESPONDENCE TABLE (UPDATED) ~600

| ID | SOFTWARE | HARDWARE | | FAILURE STATE | | IDENTIFICATION |
| | SAS NUMBER (SOFTWARE) | SAS NUMBER (HARDWARE) | STATE | SOFTWARE | HARDWARE | |
| --- | --- | --- | --- | --- | --- | --- |
| 0 | SAS-xxxx-scsi-aaaa | PPPP | Operational | ○ | ○ | — |
| 1 | SAS-xxxx-scsi-bbbb | QQQQ | Operational | ○ | ○ | — |
| 2 | SAS-xxxx-scsi-cccc | UUUU | Available | × | ○ | C |
| 3 | SAS-xxxx-scsi-dddd | SSSS | Operational | ○ | ○ | — |
| 4 | SAS-xxxx-scsi-eeee | TTTT | Operational | ○ | ○ | — |
| 5 | SAS-xxxx-scsi-ffff | RRRR | Operational | ○ | ○ | — |
| 6 | SAS-xxxx-scsi-gggg | VVVV | Operational | ○ | ○ | — |
| 7 | SAS-xxxx-scsi-hhhh | WWWW | Operational | ○ | ○ | — |

FIG. 20

Table 2001 — SOFTWARE

| ID | SAS NUMBER (SOFTWARE) |
|---|---|
| 0 | SAS-xxxx-scsi-aaaa |
| 1 | SAS-xxxx-scsi-bbbb |
| 2 | SAS-xxxx-scsi-cccc |
| 3 | SAS-xxxx-scsi-dddd |
| 4 | SAS-xxxx-scsi-eeee |
| 5 | SAS-xxxx-scsi-ffff |
| 6 | SAS-xxxx-scsi-gggg |
| 7 | SAS-xxxx-scsi-hhhh |

Table 2002 — HARDWARE

| SAS NUMBER (HARDWARE) | STATE |
|---|---|
| PPPP | Operational |
| QQQQ | Operational |
| RRRR | Operational |
| SSSS | Operational |
| TTTT | Operational |
| VVVV | Operational |
| WWWW | Operational |

FIG. 21

| ID | SOFTWARE | HARDWARE | | FAILURE STATE | | IDENTIFICATION |
| | SAS NUMBER (SOFTWARE) | SAS NUMBER (HARDWARE) | STATE | SOFTWARE | HARDWARE | |
| --- | --- | --- | --- | --- | --- | --- |
| 0 | SAS-xxxx-scsi-aaaa | PPPP | Operational | ○ | ○ | – |
| 1 | SAS-xxxx-scsi-bbbb | QQQQ | Operational | ○ | ○ | – |
| 2 | SAS-xxxx-scsi-cccc | RRRR | Operational | ○ | ○ | – |
| 3 | SAS-xxxx-scsi-dddd | SSSS | Operational | ○ | ○ | – |
| 4 | SAS-xxxx-scsi-eeee | TTTT | Operational | ○ | ○ | – |
| 5 | SAS-xxxx-scsi-ffff | UUUU | – | ○ | × | – |
| 6 | SAS-xxxx-scsi-gggg | VVVV | Operational | ○ | ○ | – |
| 7 | SAS-xxxx-scsi-hhhh | WWWW | Operational | ○ | ○ | – |

SOFTWARE/HARDWARE CORRESPONDENCE TABLE (TEMPORARY) ~600

FIG. 22

SOFTWARE/HARDWARE CORRESPONDENCE TABLE (UPDATED) ~600

| | SOFTWARE | HARDWARE | | | FAILURE STATE | | IDENTIFICATION |
|---|---|---|---|---|---|---|---|
| ID | SAS NUMBER (SOFTWARE) | SAS NUMBER (HARDWARE) | STATE | | SOFTWARE | HARDWARE | |
| 0 | SAS-xxxx-scsi-aaaa | PPPP | Operational | | ○ | ○ | – |
| 1 | SAS-xxxx-scsi-bbbb | QQQQ | Operational | | ○ | ○ | – |
| 2 | SAS-xxxx-scsi-cccc | RRRR | Operational | | ○ | ○ | – |
| 3 | SAS-xxxx-scsi-dddd | SSSS | Operational | | ○ | ○ | – |
| 4 | SAS-xxxx-scsi-eeee | TTTT | Operational | | ○ | ○ | – |
| 5a | SAS-xxxx-scsi-ffff | UUUU | – | | ○ | × | B |
| 6 | SAS-xxxx-scsi-gggg | VVVV | Operational | | ○ | ○ | – |
| 7 | SAS-xxxx-scsi-hhhh | WWWW | Operational | | ○ | ○ | – |

| ID | SOFTWARE |
|---|---|
|    | SAS NUMBER (SOFTWARE) |
| 0 | SAS-xxxx-scsi-aaaa |
| 1 | SAS-xxxx-scsi-bbbb |
| 2 | SAS-xxxx-scsi-cccc |
| 3 | SAS-xxxx-scsi-dddd |
| 4 | SAS-xxxx-scsi-eeee |
| 6 | SAS-xxxx-scsi-gggg |
| 7 | SAS-xxxx-scsi-hhhh |

2302

| HARDWARE | |
|---|---|
| SAS NUMBER (HARDWARE) | STATE |
| PPPP | Operational |
| QQQQ | Operational |
| SSSS | Operational |
| TTTT | Operational |
| UUUU | Operational |
| VVVV | Operational |
| WWWW | Operational |

FIG. 24

SOFTWARE/HARDWARE CORRESPONDENCE TABLE (AFTER FAILURE IS RESOLVED) ~600

| ID | SOFTWARE SAS NUMBER (SOFTWARE) | HARDWARE SAS NUMBER (HARDWARE) | HARDWARE STATE | FAILURE STATE SOFTWARE | FAILURE STATE HARDWARE | IDENTIFICATION |
|---|---|---|---|---|---|---|
| 0 | SAS-xxxx-scsi-aaaa | PPPP | Operational | ○ | ○ | — |
| 1 | SAS-xxxx-scsi-bbbb | QQQQ | Operational | ○ | ○ | — |
| 2 | SAS-xxxx-scsi-cccc | RRRR | Operational | ○ | ○ | — |
| 3 | SAS-xxxx-scsi-dddd | SSSS | Operational | ○ | ○ | — |
| 4 | SAS-xxxx-scsi-eeee | TTTT | Operational | ○ | ○ | — |
| 5a | SAS-xxxx-scsi-fffff | UUUU | Operational | ○ | ○ | ○ |
| 6 | SAS-xxxx-scsi-gggg | VVVV | Operational | ○ | ○ | — |
| 7 | SAS-xxxx-scsi-hhhh | WWWW | Operational | ○ | ○ | — |

FIG. 25

SOFTWARE/HARDWARE CORRESPONDENCE TABLE (TEMPORARY) ~600

| | SOFTWARE | HARDWARE | | | FAILURE STATE | | IDENTIFICATION |
|---|---|---|---|---|---|---|---|
| ID | SAS NUMBER (SOFTWARE) | SAS NUMBER (HARDWARE) | STATE | | SOFTWARE | HARDWARE | |
| 0 | SAS-xxxx-scsi-aaaa | PPPP | Operational | | ○ | ○ | — |
| 1 | SAS-xxxx-scsi-bbbb | QQQQ | Operational | | ○ | ○ | — |
| 2 | SAS-xxxx-scsi-cccc | RRRR | Operational | | ○ | × | — |
| 3 | SAS-xxxx-scsi-dddd | SSSS | Operational | | ○ | ○ | — |
| 4 | SAS-xxxx-scsi-eeee | TTTT | Operational | | ○ | ○ | — |
| 5a | SAS-xxxx-scsi-ffff | UUUU | Operational | | × | ○ | ○ |
| 6 | SAS-xxxx-scsi-gggg | VVVV | Operational | | ○ | ○ | — |
| 7 | SAS-xxxx-scsi-hhhh | WWWW | Operational | | ○ | ○ | — |

FIG. 26

SOFTWARE/HARDWARE CORRESPONDENCE TABLE (UPDATED) ~600

| ID | SOFTWARE SAS NUMBER (SOFTWARE) | HARDWARE SAS NUMBER (HARDWARE) | HARDWARE STATE | FAILURE STATE SOFTWARE | FAILURE STATE HARDWARE | IDENTIFICATION |
|---|---|---|---|---|---|---|
| 0 | SAS-xxxx-scsi-aaaa | PPPP | Operational | ○ | ○ | — |
| 1 | SAS-xxxx-scsi-bbbb | QQQQ | Operational | ○ | ○ | — |
| 2a | SAS-xxxx-scsi-cccc | UUUU | Operational | ○ | ○ | ○ |
| 3 | SAS-xxxx-scsi-dddd | SSSS | Operational | ○ | ○ | — |
| 4 | SAS-xxxx-scsi-eeee | TTTT | Operational | ○ | ○ | — |
| 5 | SAS-xxxx-scsi-ffff | RRRR | Operational | × | × | D |
| 6 | SAS-xxxx-scsi-gggg | VVVV | Operational | ○ | ○ | — |
| 7 | SAS-xxxx-scsi-hhhh | WWWW | Operational | ○ | ○ | — |

| SOFTWARE | |
|---|---|
| ID | SAS NUMBER (SOFTWARE) |
| 0 | SAS-xxxx-scsi-aaaa |
| 1 | SAS-xxxx-scsi-bbbb |
| 2 | SAS-xxxx-scsi-cccc |
| 3 | SAS-xxxx-scsi-dddd |
| 5 | SAS-xxxx-scsi-ffff |
| 6 | SAS-xxxx-scsi-gggg |

2702

| HARDWARE | |
|---|---|
| SAS NUMBER (HARDWARE) | STATE |
| PPPP | Operational |
| QQQQ | Available |
| RRRR | Operational |
| SSSS | Operational |
| TTTT | Operational |
| VVVV | Operational |
| WWWW | Operational |

FIG. 28

SOFTWARE/HARDWARE CORRESPONDENCE TABLE (TEMPORARY) ~600

| ID | SOFTWARE | HARDWARE | | | FAILURE STATE | | IDENTIFICATION |
|----|----------|----------|---|---|---------------|---|----------------|
|    | SAS NUMBER (SOFTWARE) | SAS NUMBER (HARDWARE) | STATE | | SOFTWARE | HARDWARE | |
| 0 | SAS-xxxx-scsi-aaaa | PPPP | Operational | | ○ | ○ | — |
| 1 | SAS-xxxx-scsi-bbbb | QQQQ | Available | | ○ | ○ | — |
| 2 | SAS-xxxx-scsi-cccc | RRRR | Operational | | ○ | ○ | — |
| 3 | SAS-xxxx-scsi-dddd | SSSS | Operational | | ○ | ○ | — |
| 4 | SAS-xxxx-scsi-eeee | TTTT | Operational | | × | ○ | — |
| 5 | SAS-xxxx-scsi-ffff | UUUU | — | | ○ | × | — |
| 6 | SAS-xxxx-scsi-gggg | VVVV | Operational | | ○ | ○ | — |
| 7 | SAS-xxxx-scsi-hhhh | WWWW | Operational | | × | ○ | — |

FIG. 29

SOFTWARE/HARDWARE CORRESPONDENCE TABLE (TEMPORARY 2) ~600

| ID | SOFTWARE | HARDWARE | | FAILURE STATE | | IDENTIFICATION |
|----|----------|----------|----|----|----|----|
| | SAS NUMBER (SOFTWARE) | SAS NUMBER (HARDWARE) | STATE | SOFTWARE | HARDWARE | |
| 0 | SAS-xxxx-scsi-aaaa | PPPP | Operational | ○ | ○ | — |
| 1 | SAS-xxxx-scsi-bbbb | QQQQ | Available | ○ | ○ | — |
| 2 | SAS-xxxx-scsi-cccc | RRRR | Operational | ○ | ○ | — |
| 3 | SAS-xxxx-scsi-dddd | SSSS | Operational | ○ | ○ | — |
| 4 | SAS-xxxx-scsi-eeee | TTTT | Operational | ○ | ○ | — |
| 5 | SAS-xxxx-scsi-ffff | UUUU | Operational | ○ | ○ | ex-D |
| 6 | SAS-xxxx-scsi-gggg | VVVV | Operational | ○ | ○ | — |
| 7 | SAS-xxxx-scsi-hhhh | WWWW | Operational | × | ○ | — |

FIG. 30

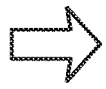

SOFTWARE/HARDWARE CORRESPONDENCE TABLE (TEMPORARY 3) ~600

| ID | SOFTWARE | HARDWARE | | FAILURE STATE | | IDENTIFICATION |
|---|---|---|---|---|---|---|
| | SAS NUMBER (SOFTWARE) | SAS NUMBER (HARDWARE) | STATE | SOFTWARE | HARDWARE | |
| 0 | SAS-xxxx-scsi-aaaa | PPPP | Operational | ○ | ○ | – |
| 1 | SAS-xxxx-scsi-bbbb | WWWW | Operational | ○ | ○ | – |
| 2 | SAS-xxxx-scsi-cccc | RRRR | Operational | ○ | ○ | – |
| 3 | SAS-xxxx-scsi-dddd | SSSS | Operational | ○ | ○ | – |
| 4 | SAS-xxxx-scsi-eeee | UUUU | Operational | ○ | ○ | ○ |
| 5 | SAS-xxxx-scsi-ffff | TTTT | Operational | ○ | ○ | – |
| 6 | SAS-xxxx-scsi-gggg | VVVV | Operational | ○ | ○ | – |
| 7 | SAS-xxxx-scsi-hhhh | QQQQ | Available | × | ○ | ○ |

FIG. 31

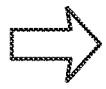

SOFTWARE/HARDWARE CORRESPONDENCE TABLE (UPDATED) ~600

| ID | SOFTWARE SAS NUMBER (SOFTWARE) | HARDWARE SAS NUMBER (HARDWARE) | HARDWARE STATE | FAILURE STATE SOFTWARE | FAILURE STATE HARDWARE | IDENTIFICATION |
|---|---|---|---|---|---|---|
| 0 | SAS-xxxx-scsi-aaaa | PPPP | Operational | ○ | ○ | — |
| 1 | SAS-xxxx-scsi-bbbb | WWWW | Operational | ○ | ○ | — |
| 2 | SAS-xxxx-scsi-cccc | RRRR | Operational | ○ | ○ | — |
| 3 | SAS-xxxx-scsi-dddd | SSSS | Operational | ○ | ○ | — |
| 4 | SAS-xxxx-scsi-eeee | UUUU | Operational | ○ | ○ | ○ |
| 5 | SAS-xxxx-scsi-ffff | TTTT | Operational | ○ | ○ | — |
| 6 | SAS-xxxx-scsi-gggg | VVVV | Operational | ○ | ○ | — |
| 7 | SAS-xxxx-scsi-hhhh | QQQQ | Operational | ○ | ○ | ○ |

| SOFTWARE | |
|---|---|
| ID | SAS NUMBER (SOFTWARE) |
| 0 | SAS-xxxx-scsi-aaaa |
| 1 | SAS-xxxx-scsi-bbbb |
| 2 | SAS-xxxx-scsi-cccc |
| 3 | SAS-xxxx-scsi-dddd |
| 4 | SAS-xxxx-scsi-eeee |
| 5 | SAS-xxxx-scsi-ffff |
| 6 | SAS-xxxx-scsi-gggg |

3202

| HARDWARE | |
|---|---|
| SAS NUMBER (HARDWARE) | STATE |
| PPPP | Operational |
| QQQQ | Available |
| RRRR | Operational |
| SSSS | Operational |
| TTTT | Operational |
| UUUU | Operational |
| VVVV | Operational |
| WWWW | Operational |

FIG. 33

```
To: [Manager]
From: [Admin]
Subject: REPORT ON THE STORAGE MAINTENANCE
-----------------------------------------------------
THE FOLLOWING PROBLEMS WERE FOUND IN LOGS RELATED TO STORAGE TO BE MANAGED.
 SOFTWARE LOG MISSING (Xs)            : 20 LOCATIONS (ID = 23, 37, 51, ...)
 HARDWARE LOG MISSING (Xh)            : 11 LOCATIONS (SAS NUMBER (HARDWARE) = ssss, yyyy, ...)
 HARDWARE LOG "Available" DISPLAY (Xa): 10 LOCATIONS (SAS NUMBER (HARDWARE) = tttt, zzzz, ...)

AS A RESULT OF THE ANALYSIS, THE FOLLOWING FAILURE FACTORS WERE FOUND IN THE HDDS.
 FAILURE TYPE   SOFTWARE   HARDWARE
     B             ○          ×         (NB=)  1 LOCATION
     C             ×          ○         (NC=) 10 LOCATIONS
     D             ×          ×         (ND=) 10 LOCATIONS

PLEASE PERFORM THE MAINTENANCE ACCORDING TO THE FOLLOWING PROCEDURE.
 1. EXCHANGE HDDS CORRESPONDING TO THE HARDWARE LOG MISSING PIECES.
    (11 LOCATIONS, CORRESPONDING TO FAILURES B AND D)
 2. REEXAMINE FAILURES, UPDATE THE SOFTWARE AND HARDWARE LOGS, AND COMPARE WITH THE TABLE.
 3. PERFORM SOFTWARE RECOVERY MEASURES FOR THE HDDS HAVING REMAINING SOFTWARE LOG MISSING
    PIECES (CORRESPONDING TO FAILURE C, 10 LOCATIONS) AND EXCHANGE HDD WHEN RESULTING "NG".
 4. REEXAMINE FAILURES AGAIN, UPDATE THE SOFTWARE AND HARDWARE LOGS, COMPARE WITH THE TABLE,
    AND CHECK WHETHER THE FAILURE LOCATIONS ARE RESOLVED.

THE END
```

3300

INFORMATION PROCESSING APPARATUS AND METHOD OF MONITORING OPERATION

CROSS-REFERENCE TO RELATED APPLICATION

This application is based upon and claims the benefit of priority of the prior Japanese Patent Application No. 2021-105423, filed on Jun. 25, 2021, the entire contents of which are incorporated herein by reference.

FIELD

The embodiment discussed herein is related to an information processing apparatus and a method of monitoring an operation.

BACKGROUND

There is a technology called a software defined storage (SDS) that implements storage functions on a general-purpose server using software. By using the SDS, for example, it may be possible to build a large capacity storage by bundling a plurality of general-purpose servers and hard disk drives (HDDs) thereof.

As a related art, for example, there is a technology for acquiring information from a management agent of each device in a storage area network (SAN) and managing the correspondence relationship among the server, virtual volume, and real volume in the SAN based on the acquired information. There is another technology for managing a logical configuration of a logical disk configured with physical disks and diagnosing a deterioration state of the logical disk based on state information and a logical configuration of the physical disks. There is still another technology for, when an error occurred in a physical port to which a device is coupled, determining whether the error is caused by a failure of the device or caused by a failure of the physical port.

Japanese Laid-open Patent Publication No. 2005-025483, Japanese Laid-open Patent Publication No. 2011-180673, and Japanese Laid-open Patent Publication No. 2013-191026 are disclosed as related art.

SUMMARY

According to an aspect of the embodiment, an information processing apparatus includes a memory, and a processor coupled to the memory and the processor configured to acquire first information that indicates a correspondence relationship between a virtual identifier of a memory device included in a storage device and a first identifier of a slot to which the memory device is attached among slots included in the storage device, the virtual identifier being recognized by a storage control software for implementing a distributed storage by using memory devices included in the storage device, the first identifier being recognized by an operating system (OS) of the storage device, acquire, from a state monitoring circuit that monitors a life-and-death state of the memory device, second information that indicates a correspondence relationship between a second identifier of a slot to which the memory device is attached and a state of the memory device, the second identifier being recognized by the state monitoring circuit, generate correspondence information that indicates a correspondence relationship among the virtual identifier, the first identifier, and the second identifier based on the first information and the second information, acquire, during an operation of the distributed storage, third information that indicates correspondence relationship between the virtual identifier and the first identifier, acquire, during the operation of the distributed storage, fourth information that indicates correspondence relationship between the second identifier and the state of the memory device from the state monitoring circuit, and update the correspondence relationship between the first identifier and the second identifier in the correspondence information, based on a result of comparing the third information and the fourth information with the correspondence information.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 6 is a diagram illustrating an example of stored content of a software/hardware correspondence table;

FIG. 8 is a diagram illustrating a specific example of first HDD information (initial);

FIG. 9 is a diagram illustrating a specific example of second HDD information (initial);

FIG. 10 is a diagram illustrating a specific example of first HDD information (during an operation);

FIG. 11 is a diagram illustrating a specific example of second HDD information (during an operation);

FIG. 12 is a diagram illustrating a failure type of an HDD;

FIG. 13 is a diagram illustrating a specific example of maintenance procedure correspondence information;

FIG. 14 is a diagram (part 1) illustrating a specific example of software and hardware logs (during an operation);

FIG. 15 is a diagram (part 1) illustrating an example of update of the software/hardware correspondence table when a failure D occurred;

FIG. 16 is a diagram (part 2) illustrating an example of update of the software/hardware correspondence table when the failure D occurred;

FIG. 17 is a diagram (part 2) illustrating a specific example of the software and hardware logs (during operation);

FIG. 18 is a diagram (part 1) illustrating an example of update of the software/hardware correspondence table when a failure C occurred;

FIG. 19 is a diagram (part 2) illustrating an example of update of the software/hardware correspondence table when the failure C occurred;

FIG. 20 is a diagram (part 3) illustrating a specific example of the software and hardware logs (during operation);

FIG. 21 is a diagram (part 1) illustrating an example of update of the software/hardware correspondence table when a failure B occurred;

FIG. 22 is a diagram (part 2) illustrating an example of update of the software/hardware correspondence table when the failure B occurred;

FIG. 23 is a diagram (part 4) illustrating a specific example of the software and hardware logs (during operation);

FIG. 24 is a diagram (part 1) illustrating an example of update of the software/hardware correspondence table when the failure D occurred after the failure B;

FIG. 25 is a diagram (part 2) illustrating an example of update of the software/hardware correspondence table when the failure D occurred after the failure B;

FIG. 26 is a diagram (part 3) illustrating an example of update of the software/hardware correspondence table when the failure D occurred after the failure B;

FIG. 27 is a diagram (part 5) illustrating a specific example of the software and hardware logs (during operation);

FIG. 28 is a diagram (part 1) illustrating an example of update of the software/hardware correspondence table when a plurality of failures occurred;

FIG. 29 is a diagram (part 2) illustrating an example of update of the software/hardware correspondence table when a plurality of failures occurred;

FIG. 30 is a diagram (part 3) illustrating an example of update of the software/hardware correspondence table when a plurality of failures occurred;

FIG. 31 is a diagram (part 4) illustrating an example of update of the software/hardware correspondence table when a plurality of failures occurred;

FIG. 32 is a diagram illustrating a specific example of the software and hardware logs (reexamination);

FIG. 33 is a diagram illustrating a specific example of a fault occurrence report;

DESCRIPTION OF EMBODIMENT

In the related art, it may be difficult to identify a failure location in a memory device such as an HDD in a distributed storage system built by using the SDS.

Hereinafter, an embodiment will be described in detail with reference to the accompanying drawings.

Embodiment

Figure 1:
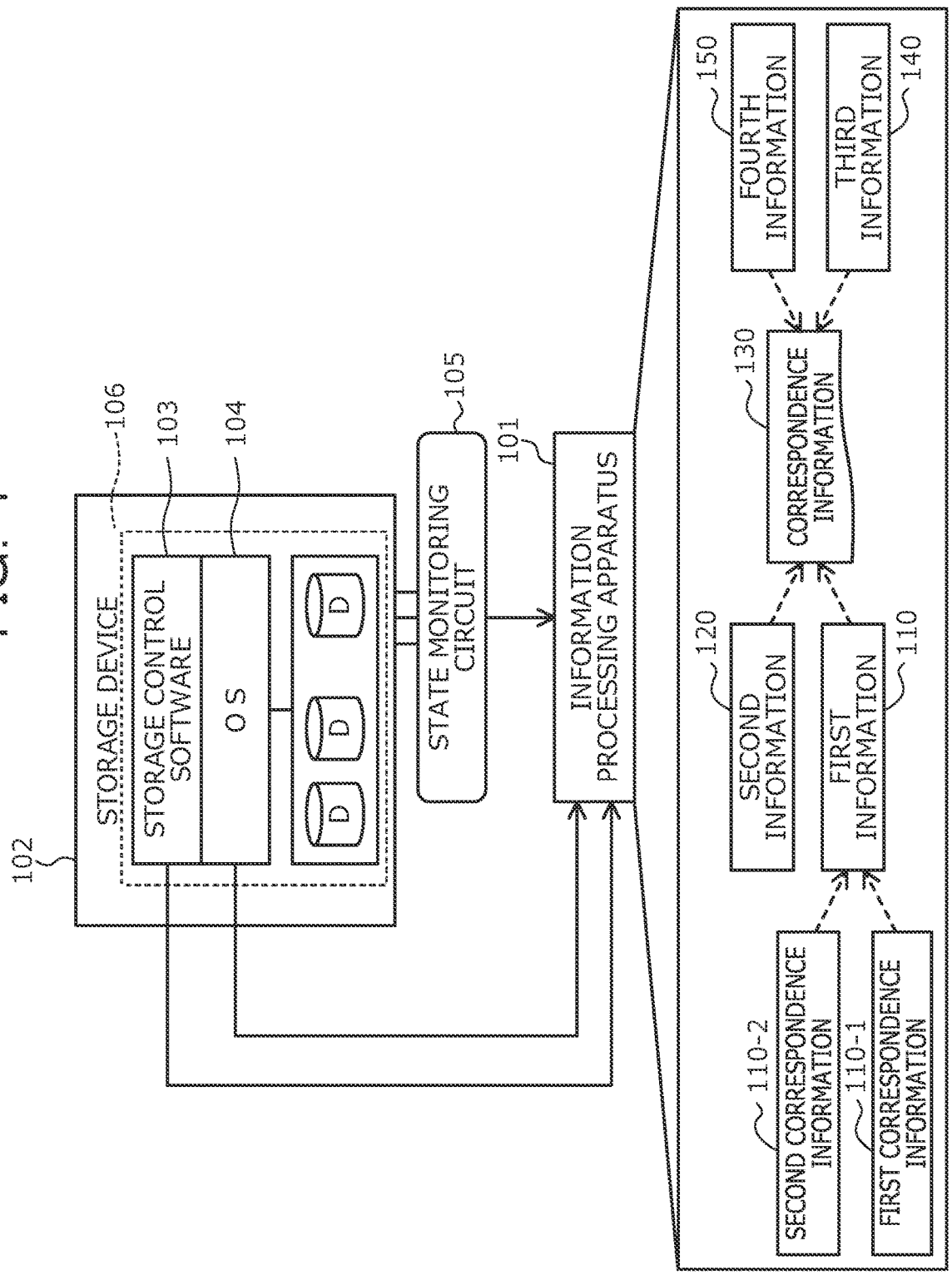
FIG. 1 is a diagram illustrating an example of an information processing apparatus according to an embodiment.

FIG. 1 is a diagram illustrating an example of an information processing apparatus 101 according to an embodiment. In FIG. 1, the information processing apparatus 101 is a computer that enables identification of a failure location in a memory device D in a distributed storage. The distributed storage is a storage system built by using the SDS, performs distribution and replication of data to improve performance, availability, reliability, and the like. The memory device D is, for example, an HDD, a solid-state drive (SSD), or the like.

In recent years, from the viewpoint of reducing costs in development and human resources, storage control software of open source software (OSS) is actively used as software for implementing a distributed storage. In order to operate the distributed storage, management of the storage (memory device) is performed.

For example, as an existing management function, there is a management function of monitoring a life-and-death state of an HDD coupled to each slot of a serial attached Small Computer System Interface (SAS) card by dedicated hardware (storage state monitoring hardware) without depending on an operating system (OS) of a server main body and displaying the life-and-death state on a dashboard.

A failure detected by the management function is, for example, a hardware-based (physical) failure. When the physical failure occurred, HDD exchange is desired. The failure detected by the management function may include a software-based failure caused by a defragmentation fail or the like. For the software-based failure, the HDD may be restored by performing software recovery measures such as re-defragmentation or formatting.

It is considered that a failure in an HDD is detected by storage control software for implementing a distributed storage. For example, in the storage control software, an HDD is managed by an ID (virtual identifier) and a device name (virtual device name) assigned at the time of installation or reboot. For this reason, it is conceivable to detect, as a failure, an HDD having an ID that is no longer recognized on the storage control software.

However, the storage control software provided as an OSS and the storage state monitoring hardware are separately developed and are not assumed to coordinate with each other. For this reason, in the related art, it is not possible to identify a failure factor by comparing the detection result of a failure detected by the storage control software with the detection result of a failure detected by the storage state monitoring hardware.

For example, information, which indicates to which slot of the SAS card the HDD corresponding to each ID is attached, is not managed in the storage control software. For this reason, during the operation of the distributed storage, when the ID is not recognizable by the storage control software, it is not possible to identify to which slot the HDD corresponding to the ID is attached, thereby it is not possible to compare the detection result of a failure detected by the storage control software with the detection result of a failure detected by the storage state monitoring hardware.

Association between a virtual device name assigned by the storage control software and a slot to which an HDD having the virtual device name is attached is performed by an OS of a server main body, for example. For this reason, for example, it is conceivable to identify a correspondence relationship between an ID recognized by the storage control software and an identifier of a slot recognized by the OS, with the virtual device name as a mediator.

However, a naming rule may differ between an identifier of a slot recognized by the OS and an identifier of a slot recognized by the storage state monitoring hardware. In this case, for example, when the ID is not recognizable by the storage control software, it is still not possible to identify to which slot the HDD corresponding to the ID is attached, thereby it is not possible to compare the detection result of a failure detected by the storage control software with the detection result of a failure detected by the storage state monitoring hardware.

In a case where the failure location is not identified by comparing the detection result of the failure detected by the storage control software with the detection result of the failure detected by the storage state monitoring hardware, it takes time to handle a failure at the time when the fault occurs. For example, when the ID is not recognizable by the storage control software, it is also conceivable to perform measures of manually examining the HDD corresponding to the ID and exchanging the HDD without coordinating with the storage state monitoring hardware. However, it takes a workload and work time to examine the HDD corresponding to the ID that is not recognizable.

In the present embodiment, the failure location in the memory device D is easily identified by building a mechanism for comparing a failure status of the memory device D detected by the storage control software with a failure status detected by the storage state monitoring hardware. Hereinafter, an example of processing of the information processing apparatus 101 will be described with reference to FIG. 1.

(1) The information processing apparatus 101 acquires first information 110. The first information 110 indicates a correspondence relationship between a virtual identifier of the memory device D recognized by the storage control software 103 of a storage device 102 and a first identifier of the slot to which the memory device D is attached among the slots included in the storage device 102. The first information 110 corresponds to a distributed storage in a state in which a failure did not occur in the memory device D (for example, an initial state at the start of operation of the distributed storage).

The virtual identifier is a virtual identifier for identifying the memory device D in the storage control software 103. For example, when the storage system is built by N memory devices D, N virtual identifiers are prepared. The first identifier is an identifier of a slot recognized by an OS 104 of the storage device 102. The slot is a storage means capable of attaching and detaching the memory device D coupled to the storage device 102. The slot is, for example, a slot of an SAS card.

The storage control software 103 is software for implementing the distributed storage 106 by using the memory device D of the storage device 102. The storage control software 103 manages the memory device D and controls access to the memory device D. For example, the storage control software 103 is an OSS such as Ceph®. For example, the storage control software 103 enables access in units of objects, blocks, and files, and enables flexible expansion of the capacity.

For example, the information processing apparatus 101 acquires first correspondence information 110-1 from the storage control software 103. The first correspondence information 110-1 indicates a correspondence relationship between a virtual identifier and a virtual device name assigned to the memory device D by the storage control software 103. The virtual identifier and the virtual device name are identification information for management.

The virtual device name is a virtual name of the memory device D, which is used by the OS 104 of the storage device 102. The virtual device name is notified from the storage control software 103 to the OS 104 and recognized by the OS 104. For example, the virtual identifier and the virtual device name are assigned to each of the memory devices D at the time of installation or reboot of the storage control software 103.

The information processing apparatus 101 acquires second correspondence information 110-2 from the OS 104 of the storage device 102. The second correspondence information 110-2 indicates a correspondence relationship between the virtual device name assigned to the memory device D and the first identifier of the slot to which the memory device D is attached among the slots included in the storage device 102. Association between the virtual device name assigned by the storage control software 103 and the slot to which the memory device D having the virtual device name is attached is performed by the OS 104, for example.

By creating the first information 110 based on the acquired first correspondence information 110-1 and the second correspondence information 110-2, the information processing apparatus 101 acquires the created first information 110. For example, the information processing apparatus 101 creates the first information 110 indicating the correspondence relationship between the virtual identifier and the first identifier of the slot with the virtual device name, which is included in the first correspondence information 110-1 and the second correspondence information 110-2, as a mediator.

However, the first information 110 may be created in another computer (for example, the OS 104 of the storage device 102) different from the information processing apparatus 101. In this case, the information processing apparatus 101 may acquire the first information 110 from another computer (for example, the OS 104 of the storage device 102).

(2) The information processing apparatus 101 acquires second information 120 from a state monitoring circuit 105. The state monitoring circuit 105 is dedicated hardware for monitoring a life-and-death state of the memory device D attached to each slot included in the storage device 102. The memory device D that is attached to each slot included in the storage device 102 is used for the distributed storage 106 implemented by the storage control software 103.

The second information 120 indicates a correspondence relationship between a second identifier of the slot to which the memory device D is attached and a state of the memory device D, which are recognized by the state monitoring circuit 105. The second information 120 corresponds to a distributed storage 106 in a state in which a failure did not occur in the memory device D (for example, an initial state at the start of operation of the distributed storage).

(3) The information processing apparatus 101 generates correspondence information 130 indicating a correspondence relationship among the virtual identifier of the memory device D, the first identifier, and the second identifier, based on the acquired first information 110 and the acquired second information 120. For example, the information processing apparatus 101 may generate the correspondence information 130 by associating the first identifier included in the first information 110 with the second identifier included in the second information 120 in the order of appearance.

As a result, it may be possible to generate the correspondence information 130 in which the first identifier of the slot recognized by the OS 104 of the storage device 102 and the second identifier of the slot recognized by the state monitoring circuit 105 are temporarily associated with each other. At this point, the correspondence relationship between the first identifier and the second identifier in the correspondence information 130 may not be correct.

(4) The information processing apparatus 101 acquires third information 140 and also acquires fourth information 150 during the operation of the distributed storage 106. The third information 140 indicates a correspondence relationship between the virtual identifier of the memory device D recognized by the storage control software 103 and the first identifier of the slot to which the memory device D is attached.

For example, the third information 140 is acquired by a similar procedure as that of the first information 110. However, the content of the third information 140 may be different from that of the first information 110. For example, when there is no response to the request or there is an error response due to a physical failure of the memory device D or a failure in defragmentation (optimization) of the memory device D, the virtual identifier assigned to the memory device D is not recognized by the storage control software 103. In such a case, in the third information 140, the information (the virtual identifier and the first identifier of the slot) on the memory device D is missing, and the content is different from that of the first information 110.

The fourth information 150 indicates a correspondence relationship between the second identifier of the slot to which the memory device D is attached and the state of the memory device D, which are recognized by the state monitoring circuit 105. For example, when the failure is detected in the memory device D by the state monitoring circuit 105 due to the physical failure of the memory device D, in the fourth information 150, for example, the information (the second identifier of the slot) on the memory device D is missing, and the content is different from that of the second information 120.

(5) The information processing apparatus 101 updates the correspondence relationship between the first identifier and the second identifier in the correspondence information 130 based on a result of comparing the acquired third information 140 and the fourth information 150 with the generated correspondence information 130.

For example, the information processing apparatus 101 determines whether or not the first identifier of the failure location identified based on the third information 140 and the second identifier of the failure location identified based on the fourth information 150 correspond to each other in the correspondence information 130. The determination as to whether or not the first identifier of the failure location and the second identifier of the failure location correspond to each other is determined by the fact whether or not the ID corresponding to the first identifier of the failure location and the ID corresponding to the second identifier of the failure location are the same, for example.

When the first identifier of the failure location and the second identifier of the failure location correspond to each other, the information processing apparatus 101 does not update the correspondence information 130. On the other hand, when the first identifier of the failure location and the second identifier of the failure location do not correspond to each other, for example, the information processing apparatus 101 replaces the second identifier of the failure location with the second identifier corresponding to the first identifier of the failure location in the correspondence information 130. That is, when a failure position detected by the storage control software 103 (failure position on the software side) and a failure position detected by the state monitoring circuit 105 (failure position on the hardware side) do not coincide with each other, the failure position on the hardware side is replaced to align with the failure position on the software side.

As described above, according to the information processing apparatus 101, for example, when a failure occurred in the memory device D, a difference (contradiction) between failure positions may be corrected by comparing a failure location identified based on the third information 140 and a failure location identified based on the fourth information 150. As a result, even when the OS 104 and the state monitoring circuit 105 have different naming rules for the identifiers of the slots, it may be possible to easily identify the failure location in the memory device D.

For example, during the operation of the distributed storage 106, when the virtual identifier is not recognizable by the storage control software 103, it may be possible to identify to which slot the memory device D corresponding to the virtual identifier is attached, thereby it may be possible to compare the detection result of a failure detected by the storage control software 103 with the detection result of a failure detected by the state monitoring circuit 105, in the information processing apparatus 101. As a result, the failure location may be easily identified, and appropriate fault handling may be quickly performed.

(Example of System Configuration of Storage System 200)

Next, an example of a system configuration of a storage system 200 according to the embodiment will be described. In the following description, a case where the information processing apparatus 101 illustrated in FIG. 1 is applied to an operation monitoring server 201 included in the storage system 200 will be described herein as an example.

Figure 2:
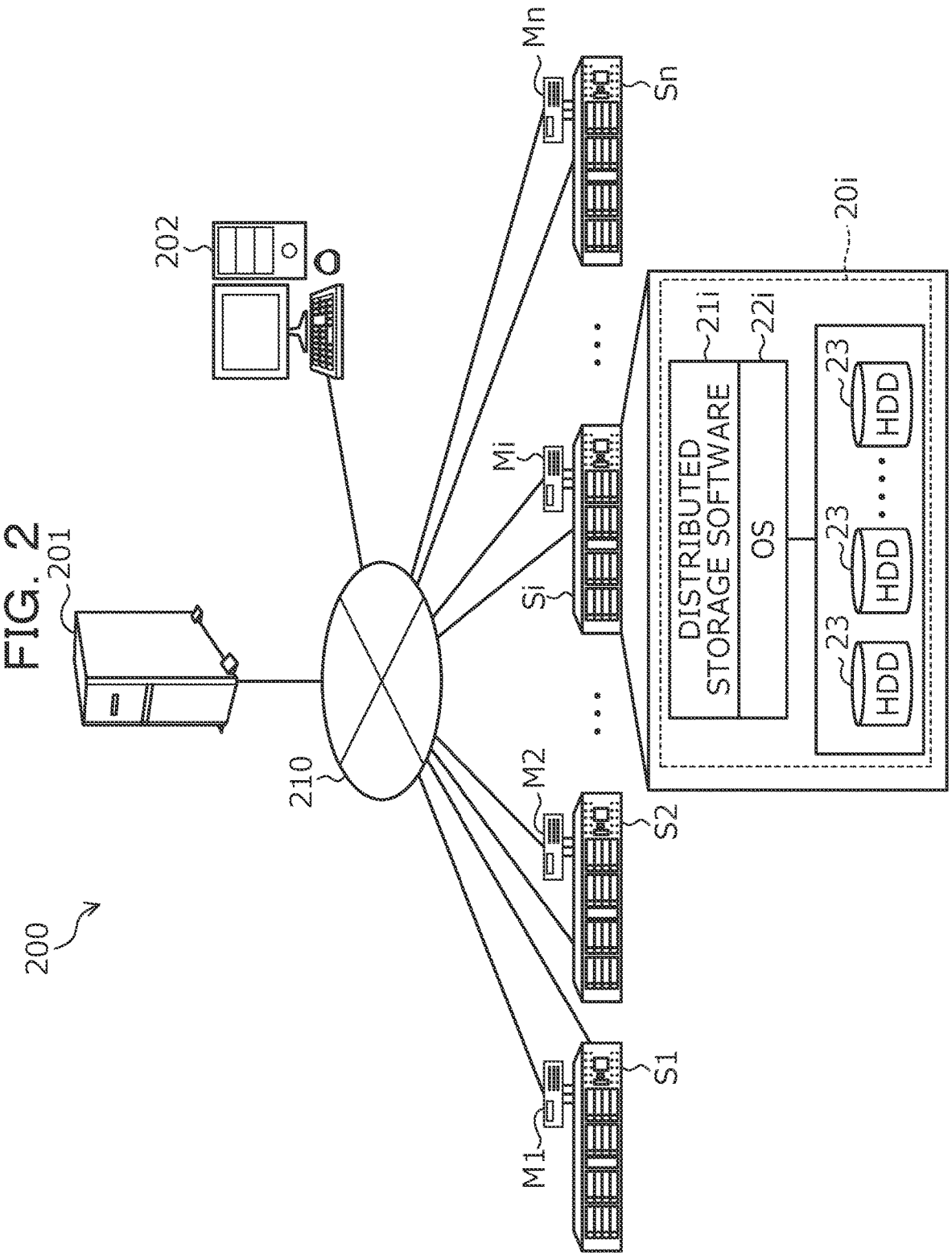
FIG. 2 is a diagram illustrating an example of a system configuration of a storage system.

FIG. 2 is a diagram illustrating an example of the system configuration of the storage system 200. As illustrated in FIG. 2, the storage system 200 includes the operation monitoring server 201, a manager terminal 202, storage servers S1 to Sn (n: a natural number equal to or greater than 2), and state monitoring hardware M1 to Mn. In the storage system 200, the operation monitoring server 201, the manager terminal 202, the storage servers S1 to Sn, and the state monitoring hardware M1 to Mn are coupled via a wired or wireless network 210. The network 210 is, for example, a local area network (LAN), a wide area network (WAN), the Internet, or the like.

In the following description, arbitrary storage server among the storage servers S1 to Sn may be referred to as a "storage server Si" (i=1, 2, . . . , n). Arbitrary state monitoring hardware among the state monitoring hardware M1 to Mn may be referred to as "state monitoring hardware Mi".

The operation monitoring server 201 performs an operation monitoring of the storage system 200. The storage system 200 is a distributed storage system built by using the SDS. For example, the operation monitoring server 201 is a server. The manager terminal 202 is a computer used by a manager of the storage system 200. For example, the manager terminal 202 is a personal computer (PC), a tablet PC, or the like.

The storage server Si is a computer including a plurality of HDDs 23. The HDD 23 is an example of the memory device D (see FIG. 1). The storage server Si includes an OS 22i and distributed storage software 21i. The OS 22i manages the entire system of the storage server Si.

The distributed storage software 21i is software for implementing the distributed storage 20i. The storage device 102 illustrated in FIG. 1 corresponds to the storage server Si, for example. The storage control software 103 illustrated in FIG. 1 corresponds to the distributed storage software 21i, for example. The OS 104 illustrated in FIG. 1 corresponds to the OS 22i, for example.

The state monitoring hardware Mi is dedicated hardware that is provided in the storage server Si and monitors the life-and-death state of the HDD 23 attached in each slot of the SAS card included in the storage server Si. The state monitoring circuit 105 illustrated in FIG. 1 corresponds to the state monitoring hardware Mi, for example.

Although the operation monitoring server 201 is separately provided from the manager terminal 202 or the storage server Si, the present disclosure is not limited thereto. For example, the operation monitoring server 201 may be implemented by the manager terminal 202 or may be implemented by the storage server Si.

(Example of Hardware Configuration of Operation Monitoring Server 201)

Next, an example of a hardware configuration of the operation monitoring server 201 will be described.

Figure 3:
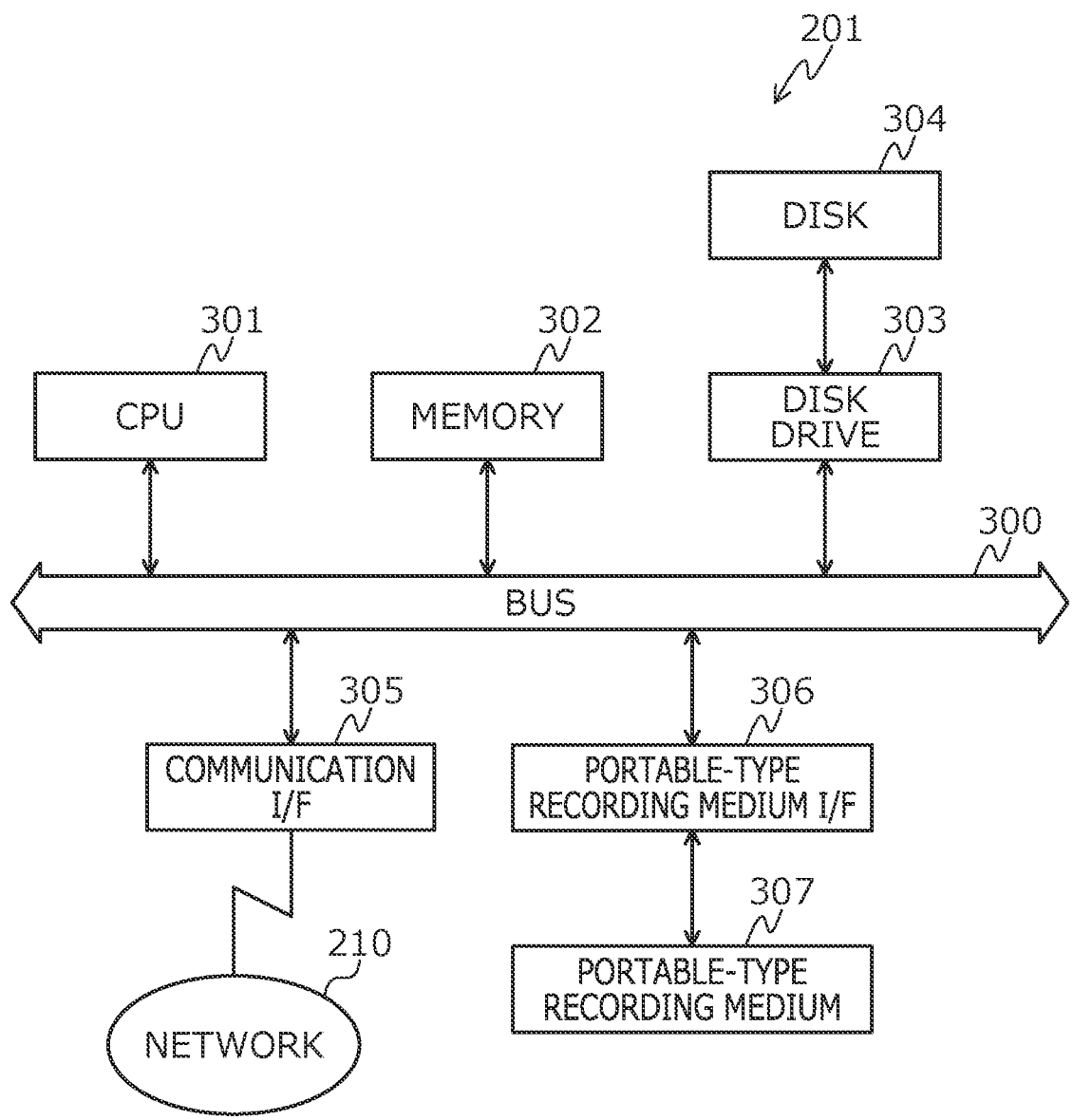
FIG. 3 is a block diagram illustrating an example of a hardware configuration of an operation monitoring server.

FIG. 3 is a block diagram illustrating an example of a hardware configuration of the operation monitoring server 201. As illustrated in FIG. 3, the operation monitoring server 201 includes a central processing unit (CPU) 301, a memory 302, a disk drive 303, a disk 304, a communication interface (I/F) 305, a portable-type recording medium I/F 306, and a portable-type recording medium 307. These components are coupled to one another through a bus 300.

The CPU 301 controls the entire operation monitoring server 201. The CPU 301 may include a plurality of cores. The memory 302 includes, for example, a read-only memory (ROM), a random-access memory (RAM), a flash ROM, and the like. For example, the flash ROM stores an operating system (OS) program, the ROM stores an application program, and the RAM is used as a work area of the CPU 301. The program stored in the memory 302 is loaded into the CPU 301, and then the processing, which is coded in the program, is executed by the CPU 301.

The disk drive 303 controls reading and writing of data from and to the disk 304 in accordance with the control of the CPU 301. The disk 304 stores data written under the control of the disk drive 303. Examples of the disk 304 include a magnetic disk, an optical disk, and the like.

The communication I/F 305 is coupled to the network 210 through a communication line and coupled to an external computer (for example, the manager terminal 202, the storage server Si, and the state monitoring hardware Mi illustrated in FIG. 2) via the network 210. The communication I/F 305 functions as an interface between the network 210 and the inside the operation monitoring server 201 and controls input and output of data from and to the external computer. As the communication I/F 305, for example, a modem, a LAN adapter, or the like may be used.

The portable-type recording medium I/F 306 controls reading and writing of data from and to the portable-type recording medium 307 in accordance with the control of the CPU 301. The portable-type recording medium 307 stores data written under the control of the portable-type recording medium I/F 306. Examples of the portable-type recording medium 307 include a compact disc (CD)-ROM, a Digital Versatile Disk (DVD), a Universal Serial Bus (USB) memory, and the like.

The operation monitoring server 201 may include, for example, an input device, a display, and so on in addition to the components described above. The manager terminal 202 and the storage server Si illustrated in FIG. 2 may be implemented by similar hardware as that of the operation monitoring server 201. However, the manager terminal 202 includes, for example, an input device and a display in addition to the components described above.

(Specific Example of Software Log (Initial))

Next, a specific example of a software log (initial) will be described with reference to FIG. 4. The first information 110 illustrated in FIG. 1 corresponds to, for example, the software log (initial).

Figure 4:
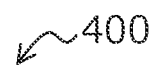
FIG. 4 is a diagram illustrating a specific example of a software log (initial)

FIG. 4 is a diagram illustrating a specific example of the software log (initial). As illustrated in FIG. 4, the software log (initial) 400 indicates a correspondence relationship between an ID and an SAS number (software). The ID is a virtual identifier for identifying the HDD 23 in the distributed storage software 21$i$. The ID is assigned to HDD 23 by the distributed storage software 21$i$.

The SAS number (software) is a first identifier for identifying a slot to which the HDD 23 is attached among slots included in the storage server Si. The first identifier is an identifier of a slot recognized by the OS 22$i$ of the storage server Si. The HDD 23, which is not recognized by the distributed storage software 21$i$ due to a software-based or hardware-based failure, is missing, for example.

For example, the software log (initial) 400 is created from first HDD information (initial) 800 illustrated in FIG. 8 and second HDD information (initial) 900 illustrated in FIG. 9, which will be described later.

(Specific Example of Hardware Log (Initial))

A specific example of the hardware log (initial) will be described with reference to FIG. 5. The second information 120 illustrated in FIG. 1 corresponds to, for example, a hardware log (initial).

Figure 5:
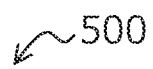
FIG. 5 is a diagram illustrating a specific example of a hardware log (initial)

FIG. 5 is a diagram illustrating a specific example of the hardware log (initial). As illustrated in FIG. 5, the hardware log (initial) 500 indicates a correspondence relationship between an SAS number (hardware) and a state. The SAS number (hardware) is a second identifier for identifying a slot to which the HDD 23 is attached among the slots of the storage server Si. The second identifier is an identifier of a slot recognized by the state monitoring hardware Mi. The SAS number (hardware) has a different naming rule from that of the SAS number (software).

The state is a state of the HDD 23 detected by the state monitoring hardware Mi. As the state, for example, "Operational" or "Available" is set. "Operational" indicates that the HDD 23 is operating normally. "Available" indicates a possibility that a software-based failure occurs in the HDD 23. The HDD 23 in which a hardware-based (physical) failure occurred is missing, for example.

(Stored Content of Software/Hardware Correspondence Table 600)

Next, the stored content of the software/hardware correspondence table 600 used by the operation monitoring server 201 will be described with reference to FIG. 6. For example, the software/hardware correspondence table 600 is generated based on the software log (initial) 400 illustrated in FIG. 4 and the hardware log (initial) 500 illustrated in FIG. 5. The correspondence information 130 illustrated in FIG. 1 corresponds to, for example, the software/hardware correspondence table 600.

FIG. 6 is a diagram illustrating an example of the stored content of the software/hardware correspondence table 600. As illustrated in FIG. 6, the software/hardware correspondence table 600 includes fields of an ID, an SAS number (software), an SAS number (hardware), a state, a failure state, and an identification, and stores software/hardware correspondence information 600-1 to 600-8 as a record by setting information in each field.

The ID is a virtual identifier for identifying the HDD 23 in the distributed storage software 21$i$. The SAS number (software) is a first identifier that identifies a slot to which the HDD 23 is attached and that is recognized by the OS 22$i$ of the storage server Si. The ID and the SAS number (software) is information identified based on the software log (for example, the software log (initial) 400 illustrated in FIG. 4).

The SAS number (hardware) is a second identifier that identifies a slot to which the HDD 23 is attached and that is recognized by the state monitoring hardware Mi. The state is a state of the HDD 23 detected by the state monitoring hardware Mi. As the state, for example, "Operational", "Available", or "-(Null)" is set. The state "-" indicates that a hardware-based (physical) failure occurred in the HDD 23. The SAS number (hardware) and the state are information identified based on the hardware log (for example, the hardware log (initial) 500 illustrated in FIG. 5).

The failure state indicates a failure state of the HDD 23 identified based on the software log and the hardware log. For example, the software "o" indicates that a failure is not identified based on the software log. For example, the hardware "o" indicates that a failure is not identified based on the hardware log. For example, the software "x" indicates that a failure is identified based on the software log. For example, the hardware "x" indicates that a failure is identified based on the hardware log.

The identification identifies the state of the HDD 23. As the identification, for example, one of "-", "B", "C", "D", and "O" is set. The identification "-" indicates a state in which the SAS number (software) and the SAS number (hardware) of the HDD 23 are temporarily associated with each other. The identification "B" indicates that a failure B in the HDD 23 is detected.

The identification "C" indicates that a failure C in the HDD 23 is detected. The identification "D" indicates that a failure D in the HDD 23 is detected. "B", "C", and "D" indicate failure types. A detailed description of the failure B, the failure C, and the failure D will be described later. The identification "O" indicates that the failure in the HDD 23 is resolved.

(Example of Functional Configuration of Operation Monitoring Server 201)

Figure 7:
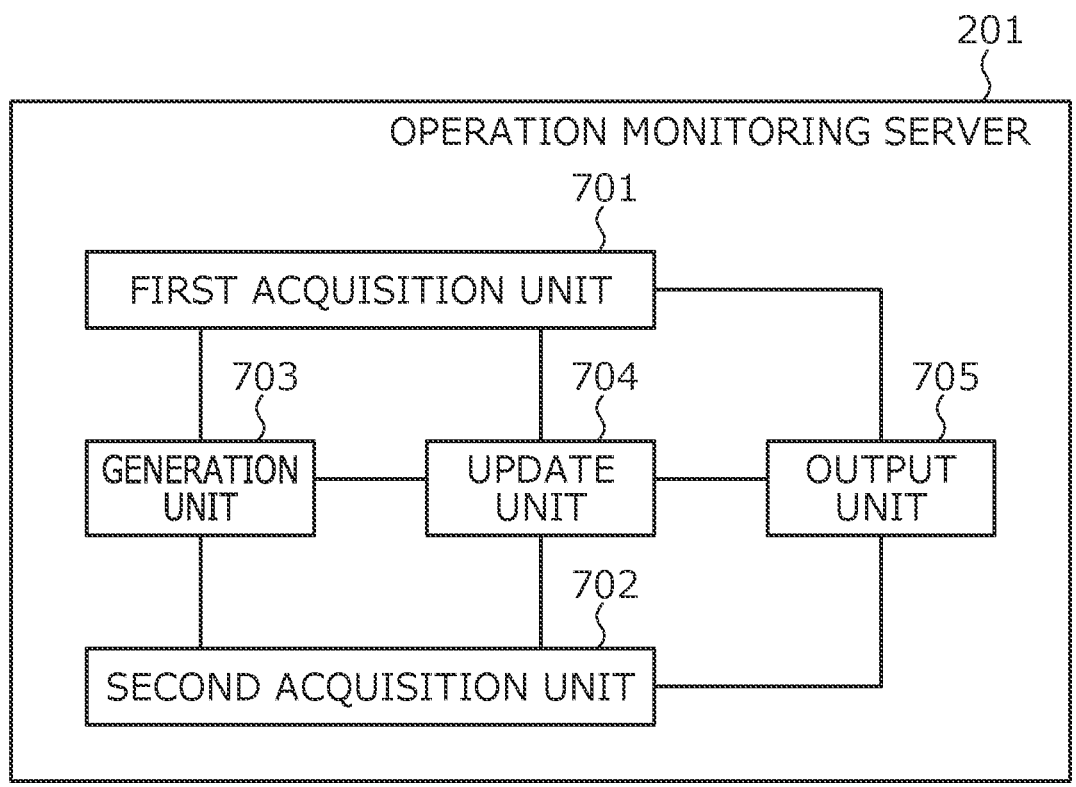
FIG. 7 is a block diagram illustrating an example of a functional configuration of the operation monitoring server.

FIG. 7 is a block diagram illustrating an example of a functional configuration of the operation monitoring server 201. As illustrated in FIG. 7, the operation monitoring server 201 includes a first acquisition unit 701, a second acquisition unit 702, a generation unit 703, an update unit 704, and an output unit 705. The first acquisition unit 701, the second acquisition unit 702, the generation unit 703, the update unit 704, and the output unit 705 are functions constituting a control unit. For example, the functions are implemented by causing the CPU 301 to execute programs stored in the memory devices such as the memory 302, the disk 304, and the portable-type recording medium 307 illustrated in FIG. 3 or by using the communication I/F 305. The processing results obtained by these functional units are stored, for example, in a memory device such as the memory 302 or the disk 304.

The first acquisition unit 701 acquires the software log (initial) related to the distributed storage 20*i*. The distributed storage 20*i* is a distributed storage implemented by using the HDD 23 of the storage server Si. The software log (initial) indicates a correspondence relationship between the virtual identifier of the HDD 23 recognized by the distributed storage software 21*i* at the start of the operation of the distributed storage 20*i* and the first identifier of the slot to which the HDD 23 is attached, which is recognized by the OS 22*i*. The slot is a storage means capable of attaching and detaching the HDD 23 coupled to the storage server Si. The slot is, for example, a slot of an SAS card.

In the following description, in some cases, the virtual identifier of the HDD 23 is referred to as the "ID", and the first identifier of the slot to which the HDD 23 is attached, which is recognized by the OS 22*i*, is referred to as the "SAS number (software)".

For example, the first acquisition unit 701 acquires the first HDD information (initial) from the distributed storage software 21*i*. The first HDD information (initial) indicates a correspondence relationship between the ID assigned to an HDD 23 by the distributed storage software 21*i* and the device name. The device name is a virtual name (virtual device name) of the HDD 23, which is used by the OS 22*i* of the storage server Si. The device name is notified from the distributed storage software 21*i* to the OS 22*i* and recognized by the OS 22*i*.

In the distributed storage software 21*i*, the ID of the HDD 23 is assigned based on an HDD_ID list, for example. The HDD_ID list is information in which IDs assigned to HDDs 23 in the storage system 200 are listed. The first correspondence information 110-1 illustrated in FIG. 1 corresponds to, for example, the first HDD information (initial).

For example, before the operation of the distributed storage 20*i* is started, the first acquisition unit 701 acquires the first HDD information (initial) from the distributed storage software 21*i* by executing a command such as "ceph-volume lvm list". A specific example of the first HDD information (initial) will be described.

FIG. 8 is a diagram illustrating a specific example of the first HDD information (initial). As illustrated in FIG. 8, the first HDD information (initial) 800 indicates a correspondence relationship between the ID assigned to the HDD 23 by the distributed storage software 21*i* and the device name. For example, the device name corresponding to the ID "1" is "/dev/sda".

For example, the first acquisition unit 701 acquires the second HDD information (initial) from the OS 22*i* of the storage server Si. The second HDD information (initial) indicates a correspondence relationship between the device name assigned to the HDD 23 and the SAS number (software) of the slot to which the HDD 23 is attached among the slots included in the storage server Si.

Association between the device name assigned by the distributed storage software 21*i* and the slot to which the HDD 23 having the device name is attached is performed by the OS 22*i*. For example, the second correspondence information 110-2 illustrated in FIG. 1 corresponds to the second HDD information (initial).

For example, before the operation of the distributed storage 20*i* is started, the first acquisition unit 701 acquires the second HDD information (initial) from the OS 22*i* by executing a command such as "ls -l/dev/disk/by-path". A specific example of the second HDD information (initial) will be described.

FIG. 9 is a diagram illustrating a specific example of the second HDD information (initial). As illustrated in FIG. 9, the second HDD information (initial) 900 indicates a correspondence relationship between the device name assigned to the HDD 23 and the SAS number (software) of the slot to which HDD 23 is attached. For example, the SAS number (software) corresponding to the device name "/dev/sd0" is "SAS-xxxx-scsi-aaaa".

For example, the first acquisition unit 701 creates the software log (initial) based on the acquired first HDD information (initial) and the second HDD information (initial). For example, the first acquisition unit 701 creates the software log (initial) 400 as illustrated in FIG. 4 by identifying a correspondence relationship between the ID and the SAS number (software) with the device name, which is included in the first HDD information (initial) 800 illustrated in FIG. 8 and the second HDD information (initial) 900 illustrated in FIG. 9, as a mediator.

As a result, it may be possible to acquire the software log (initial) indicating a correspondence relationship between the ID of the HDD 23 and the SAS number (software) of the slot to which the HDD 23 is attached, in the initial state when the operation of the distributed storage 20*i* is started.

The second acquisition unit 702 acquires the hardware log (initial) related to the distributed storage 20*i*. The hardware log (initial) indicates a correspondence relationship between the second identifier of the slot to which the HDD 23 is attached and the state of the HDD 23, which are recognized by the state monitoring hardware Mi at the start of the operation of the distributed storage 20*i*.

In the following description, the second identifier of the slot to which the HDD 23 is attached, which is recognized by the state monitoring hardware Mi, may be referred to as the "SAS number (hardware)".

For example, the second acquisition unit 702 acquires the hardware log (initial) 500 as illustrated in FIG. 5 from the state monitoring hardware Mi. For example, the second acquisition unit 702 accesses a database (not illustrated) of the state monitoring hardware Mi and acquires the hardware log (initial) 500. For example, the database stores information indicating the states of the CPU, the memory, the HDD 23, and the like of the storage server Si.

The generation unit 703 generates correspondence information indicating a correspondence relationship among the ID of the HDD 23 used in the distributed storage 20*i*, the SAS number (software), and the SAS number (hardware) based on the acquired software log (initial) and hardware log (initial).

For example, the generation unit 703 may generate the software/hardware correspondence table 600 as illustrated in FIG. 6 by associating the SAS number (software) included in the software log (initial) 400 with the SAS number (hardware) included in the hardware log (initial) 500 in the order of appearance.

In the following description, the software/hardware correspondence table 600 in the initial state may be referred to as a "software/hardware correspondence table 600 (initial state)". The failure state and identification of each HDD 23 in the initial state are software "o", hardware "o", and identification "-".

The first acquisition unit 701 acquires the software log (during operation) related to the distributed storage 20*i* during the operation of the distributed storage 20*i*. The software log (during operation) indicates a correspondence relationship between the ID of the HDD 23 recognized by the distributed storage software 21*i* during the operation of the distributed storage 20*i* and the SAS number (software) of the slot to which the HDD 23 is attached. The third information 140 illustrated in FIG. 1 corresponds to, for example, the software log (during operation).

For example, the first acquisition unit 701 acquires the first HDD information (during operation) from the distributed storage software 21*i* during the operation of the distributed storage 20*i*. The first HDD information (during operation) indicates a correspondence relationship between the ID recognized by the distributed storage software 21*i* among the IDs assigned to the HDD 23 and the device name.

For example, the first acquisition unit 701 acquires the first HDD information (during operation) from the distributed storage software 21*i* by executing a command such as "ceph-volume lvm list" periodically or in response to an instruction from the manager terminal 202 (see FIG. 2), during the operation of the distributed storage 20*i*. A specific example of the first HDD information (during operation) will be described.

FIG. 10 is a diagram illustrating a specific example of the first HDD information (during operation). As illustrated in FIG. 10, the first HDD information (during operation) 1000 indicates a correspondence relationship between the ID recognized by the distributed storage software 21*i* among the IDs assigned to the HDD 23 and the device name. In FIG. 10, since the ID "2" is not recognized by the distributed storage software 21*i*, the information related to the ID "2" is missing.

The first acquisition unit 701 acquires the second HDD information (during operation) from the OS 22*i* of the storage server Si during the operation of the distributed storage 20*i*. The second HDD information (during operation) indicates a correspondence relationship between the device name recognized by the OS 22*i* and the slot of the SAS card to which the HDD 23 is attached.

For example, the first acquisition unit 701 acquires the second HDD information (during operation) from the OS 22*i* by executing a command such as "ls -l/dev/disk/by-path" periodically or in response to an instruction from the manager terminal 202, during the operation of the distributed storage 20*i*. A specific example of the second HDD information (during operation) will be described.

FIG. 11 is a diagram illustrating a specific example of the second HDD information (during operation). As illustrated in FIG. 11, the second HDD information (during operation) 1100 indicates a correspondence relationship between the device name assigned to the HDD 23 and the SAS number (software) of the slot to which the HDD 23 is attached. In this case, the information related to the HDD 23 having the device name "/dev/sdb" that is not recognized by the OS 22*i* is missing.

For example, the first acquisition unit 701 creates the software log (during operation) based on the acquired first HDD information (during operation) and the second HDD information (during operation). For example, the first acquisition unit 701 creates the software log (during operation) by identifying a correspondence relationship between the ID and the SAS number (software) with the device name, which is included in the first HDD information (during operation) 1000 illustrated in FIG. 10 and the second HDD information (during operation) 1100 illustrated in FIG. 11, as a mediator.

As a result, it may be possible to acquire the software log (during operation) indicating a correspondence relationship between the ID of the HDD 23 recognized by the distributed storage software 21*i* during the operation of the distributed storage 20*i* and the SAS number (software) of the slot to which the HDD 23 is attached. A specific example of the software log (during operation) will be described below with reference to FIG. 14, for example.

The second acquisition unit 702 acquires the hardware log (during operation) related to the distributed storage 20*i* during the operation of the distributed storage 20*i*. The hardware log (during operation) indicates a correspondence relationship between the SAS number (hardware) of the slot to which the HDD 23 is attached and the state of the HDD 23, which are recognized by the state monitoring hardware Mi during the operation of the distributed storage 20*i*. The fourth information 150 illustrated in FIG. 1 corresponds to, for example, the hardware log (during operation).

For example, the second acquisition unit 702 acquires the hardware log (during operation) from the state monitoring hardware Mi during the operation of the distributed storage 20i. For example, the second acquisition unit 702 accesses a database (not illustrated) of the state monitoring hardware Mi and acquires the hardware log (during operation). A specific example of the hardware log (during operation) will be described below with reference to FIG. 15, for example.

The update unit 704 updates the correspondence relationship between the SAS number (software) and the SAS number (hardware) in the generated correspondence information based on the SAS number (software) of the failure location identified based on the acquired software log (during operation) and the SAS number (hardware) of the failure location identified based on the acquired hardware log (during operation).

For example, in the software log (during operation), the ID of the HDD 23 that is no longer recognized by the distributed storage software 21i is hidden. For this reason, for example, the update unit 704 compares the software log (during operation) with the software/hardware correspondence table 600 and identifies the SAS number (software) corresponding to the missing ID, as the SAS number (software) of the failure location.

The software/hardware correspondence table 600 to be compared is the latest software/hardware correspondence table 600. For example, the software/hardware correspondence table 600 to be compared with the software log (during operation), which is acquired at the very first after the start of the operation of the distributed storage 20i, is the software/hardware correspondence table 600 (initial state).

For example, in the hardware log (during operation), the SAS number (hardware) of the HDD 23 in which a hardware-based (physical) failure is detected by the state monitoring hardware Mi is missing. In the hardware log (during operation), the state of the HDD 23 in which a software-based failure is detected by the state monitoring hardware Mi becomes "Available".

For this reason, for example, the update unit 704 compares the hardware log (during operation) with the software/hardware correspondence table 600 and identifies the SAS number (hardware) that is missing or "Available" as the SAS number (hardware) of the failure location.

The software/hardware correspondence table 600 to be compared is the latest software/hardware correspondence table 600. For example, the software/hardware correspondence table 600 to be compared with the hardware log (during operation), which is acquired at the very first after the start of the operation of the distributed storage 20i, is the software/hardware correspondence table 600 (initial state).

When the SAS number (software) of the identified failure location and the SAS number (hardware) of the identified failure location do not correspond to each other in the software/hardware correspondence table 600, for example, the update unit 704 replaces the SAS number (hardware) of the failure location with the SAS number (hardware) corresponding to the SAS number (software) of the failure location.

As a result, the update unit 704 fixes the failure position on the software side and corrects a difference between failure positions by aligning the failure position on the hardware side with the failure position on the software side. The failure position on the hardware side is a failure position identified based on the hardware log. The failure position on the software side is a failure position identified based on the software log.

When the SAS number (software) of the failure location and the SAS number (hardware) of the failure location do not correspond to each other in the software/hardware correspondence table 600, the update unit 704 may replace the SAS number (software) of the failure location with the SAS number (software) corresponding to the SAS number (hardware) of the failure location. That is, the update unit 704 may fix the failure position on the hardware side and correct the difference between the failure positions by aligning the failure position on the software side with the failure position on the hardware side.

In some cases, the SAS number (software) of the failure location is not identified based on the software log (during operation), but the SAS number (hardware) of the failure location is identified based on the hardware log (during operation). For example, due to incorrect recognition of the distributed storage software 21i, a failure may not be detected on the software side even when a hardware-based failure occurred.

In this case, the update unit 704 may attach a specific identifier to an ID (virtual identifier) corresponding to the SAS number (hardware) of the failure location in the software/hardware correspondence table 600. The specific identifier indicates that only a hardware failure is detected out of a software failure and a hardware failure.

After the failure in the HDD 23 having the SAS number (hardware) of the failure location is resolved, the SAS number (hardware) may be replaced in the software/hardware correspondence table 600. When replacing the SAS number (hardware) of the HDD 23, in which the failure is resolved, with another SAS number (hardware) in the software/hardware correspondence table 600, the update unit 704 replaces the specific identifier with an ID corresponding to the another SAS number (hardware).

As a result, even when the SAS number (hardware) of the software/hardware correspondence table 600 is replaced, a location where only a hardware failure is detected may be identified based on the specific identifier that is attached to the ID.

Hereinafter, an example of specific processing of the update unit 704 will be described. In the following description, a software-based failure may be referred to as a "software failure", and a hardware-based failure may be referred to as a "hardware failure". The software log (during operation) and the hardware log (during operation) may be collectively referred to as the "software and hardware logs (during operation)".

For example, the update unit 704 identifies the failure type of the HDD 23 based on the result of comparing the software and hardware logs (during operation) with the software/hardware correspondence table 600, and updates the software/hardware correspondence table 600 in accordance with the identified failure type.

The failure type of the HDD 23 is described with reference to FIG. 12.

FIG. 12 is a diagram illustrating the failure type of the HDD 23. As illustrated in FIG. 12, a failure type table 1200 is information for classifying the failure in the HDD 23 based on an expression mode of the information in the software and hardware logs. The failure type includes a failure A, a failure B, a failure C, and a failure D.

The failure A indicates a state in which neither a software failure nor a hardware failure is detected. The failure A corresponds to the HDD 23 for which the ID is shown in the software log (during operation) and the state is "Operational" in the hardware log (during operation). Although the failure A indicates a state in which the HDD 23 is normal, the failure A is referred to as the "failure A" for convenience.

The failure B indicates a state in which only a hardware failure is detected out of a software failure and a hardware failure. The failure B corresponds to the HDD 23 for which the ID is shown in the software log (during operation) and the SAS number (hardware) is hidden (missing) in the hardware log (during operation). Examples of the measures for the failure B include HDD exchange.

The failure C indicates a state in which only a software failure is detected out of a software failure and a hardware failure. The failure C corresponds to the HDD 23 for which the ID is hidden in the software log (during operation) and the state is "Available" in the hardware log (during operation). Examples of the measures for the failure C include a software-based recovery measures (in a case of failure: HDD exchange).

The failure D indicates a state in which a software failure and a hardware failure are detected. The failure D corresponds to the HDD 23 for which the ID is hidden in the software log (during operation) and the SAS number (hardware) is hidden in the hardware log (during operation). Examples of the measures for the failure D include HDD exchange.

For example, the update unit 704 refers to the failure type table 1200 and calculates the number of occurrences of new failure in each of the failures B, C, and D based on the result of comparing the software and hardware logs (during operation) with the software/hardware correspondence table 600.

The number of occurrences for each of events Is, Ih, Ia, Js, Jh, Ja, Xs, Xh, and Xa is defined as follows.

Is: the number of HDDs 23 for which the ID is not shown in the software log (during operation)

Ih: the number of HDDs 23 for which the SAS number (hardware) is not shown in the hardware log (during operation)

Ia: the number of HDDs 23 for which "Available" is shown in the hardware log (during operation)

Js: the number of HDDs 23 for which software "x" is shown in the failure state of the software/hardware correspondence table 600

Jh: the number of HDDs 23 for which hardware "x" is shown in the failure state of the software/hardware correspondence table 600

Ja: the number of HDDs 23 for which a state detected by the state monitoring hardware Mi is "Available" in the software/hardware correspondence table 600.

$$Xs = Is - Js \quad (1)$$

$$Xh = Ih - Jh \quad (2)$$

$$Xa = Ia - Ja \quad (3)$$

Xs, Xh, and Xa represent the number of new occurrences of each event. Xs represents the number of new occurrences of an event in which the ID of the HDD 23 is not shown in the software log. Xh represents the number of new occurrences of an event in which the SAS number (hardware) of the HDD 23 is not shown in the hardware log. Xa represents the number of new occurrences of an event in which "Available" is shown as the state of the HDD 23 in the hardware log. In the initial state, (Js, Jh, Ja) is represented as "(Js, Jh, Ja)=(0, 0, 0)".

The number of occurrences of new failure for each of the failures B, C, and D is referred to as "NB, NC, ND". In this case, Xs, Xh and Xa may be represented by using the following equations (4), (5), and (6).

$$Xs = NC + ND \quad (4)$$

$$Xh = NB + ND \quad (5)$$

$$Xa = NC \quad (6)$$

For example, the update unit 704 calculates (Xs, Xh, Xa) by using the above equations (1) to (3) based on the software and hardware logs (during operation) and the software/hardware correspondence table 600. Next, by using the above equations (4) to (6), the update unit 704 calculates the number of occurrences of new failure for each of the failures B, C, and D, which are NB, NC, ND, from the calculated (Xs, Xh, Xa).

For example, in a case where (Xs, Xh, Xa) is "(Xs, Xh, Xa)=(0, 1, 0)", (NB, NC, ND) is represented as "(NB, NC, ND)=(1, 0, 0)". "(NB, NC, ND)=(1, 0, 0)" indicates that the failure B occurred one time.

In a case where (Xs, Xh, Xa) is "(Xs, Xh, Xa)=(1, 0, 1)", (NB, NC, ND) is represented as "(NB, NC, ND)=(0, 1, 0)". "(NB, NC, ND)=(0, 1, 0)" indicates that the failure C occurred one time.

In a case where (Xs, Xh, Xa) is "(Xs, Xh, Xa)=(1, 1, 0)", (NB, NC, ND) is represented as "(NB, NC, ND)=(0, 0, 1)". "(NB, NC, ND)=(0, 0, 1)" indicates that the failure D occurred one time.

In a case where (Xs, Xh, Xa) is "(Xs, Xh, Xa)=(2, 2, 1)", (NB, NC, ND) is represented as "(NB, NC, ND)=(1, 1, 1)". "(NB, NC, ND)=(1, 1, 1)" indicates that each of the failures B, C, and D occurred one time.

For example, the update unit 704 determines whether or not a new failure occurred by referring to the calculated (NB, NC, ND). For example, when at least one of NB, NC, and ND is equal to or greater than 1, the update unit 704 determines that a new failure occurred. On the other hand, in a case where (NB, NC, ND) is "(NB, NC, ND)=(0, 0, 0)", the update unit 704 determines that no new failure occurred.

In a case where (Xs, Xh, Xa) is "(Xs, Xh, Xa)=(0, 0, 0)", the update unit 704 may determine that no new failure occurred. In a case where (Xs, Xh, Xa) is "(Xs, Xh, Xa)≠(0, 0, 0)", the update unit 704 may determine that a new failure occurred.

When a new failure occurred, the update unit 704 determines whether a single failure occurred or a plurality of failures occurred. A single failure corresponds to a case where one failure location is identified based on at least one of the software log (during operation) and the hardware log (during operation). A plurality of failures correspond to a case where a plurality of failure locations are identified based on at least one of the software log (during operation) and the hardware log (during operation).

For example, in a case where the calculated (NB, NC, ND) is any one of (1, 0, 0), (0, 1, 0), and (0, 0, 1), the update unit 704 determines that a single failure occurred. On the other hand, when (NB, NC, ND) is not any of (0, 0, 0), (1, 0, 0), (0, 1, 0), and (0, 0, 1), the update unit 704 determines that a plurality of failures occurred.

In a case of a single failure, the update unit 704 determines whether the failure type is the failure B, C, or D. In a case where the failure type is the failure B, the update unit 704 attaches a specific identifier to an ID (virtual identifier) corresponding to the SAS number (hardware) of the failure location in the software/hardware correspondence table 600. The update unit 704 sets "B" for the identification corresponding to the failure location (for example, ID) in the software/hardware correspondence table 600.

An example of update of the software/hardware correspondence table 600 when the failure B occurred will be described later with reference to FIGS. 20 to 22.

In a case where the failure type is the failure C, when the SAS number (software) of the failure location and the SAS number (hardware) of the failure location do not correspond to each other in the software/hardware correspondence table 600, the update unit 704 replaces the SAS number (hardware) of the failure location with the SAS number (hardware) corresponding to the SAS number (software) of the failure location. The update unit 704 sets "C" for the identification corresponding to the failure location (ID of the HDD 23 to be replaced) in the software/hardware correspondence table 600.

An example of update of the software/hardware correspondence table 600 when the failure C occurred will be described later with reference to FIGS. 17 to 19.

In a case where the failure type is the failure D, when the SAS number (software) of the failure location and the SAS number (hardware) of the failure location do not correspond to each other in the software/hardware correspondence table 600, the update unit 704 replaces the SAS number (hardware) of the failure location with the SAS number (hardware) corresponding to the SAS number (software) of the failure location. The update unit 704 sets "D" for the identification corresponding to the failure location (ID of the HDD 23 to be replaced) in the software/hardware correspondence table 600.

An example of update of the software/hardware correspondence table 600 when the failure D occurred will be described later with reference to FIGS. 14 to 16.

The operation monitoring server 201 may receive a notification indicating that the failure in the HDD 23 is resolved. For example, the operation monitoring server 201 receives, from the manager terminal 202, a failure resolve notification indicating that the failure in the HDD 23 is resolved, as a result of execution of maintenance such as software-based recovery measures or HDD exchange. For example, at least one of the ID, the SAS number (software), and the SAS number (hardware) of the HDD 23 in which the failure is resolved is included in the failure resolve notification.

Upon receiving the failure resolve notification, the operation monitoring server 201 may update the software/hardware correspondence table 600. For example, the update unit 704 sets "O" for the identification in the software/hardware correspondence information corresponding to the ID (or the SAS number (software) or the SAS number (hardware)) included in the received failure resolve notification.

In a case of a plurality of failures, the update unit 704 identifies a maintenance procedure corresponding to the combination of the calculated NB, NC, and ND by referring to the maintenance procedure correspondence information, for example. The maintenance procedure correspondence information is information indicating a maintenance procedure used for failure recovery in association with a combination of the number of occurrences of the failure B, the number of occurrences of the failure C, and the number of occurrences of the failure D.

The number of occurrences of the failure B is the number of HDDs 23 in which only a hardware failure is detected out of a software failure and a hardware failure. The number of occurrences of the failure C is the number of HDDs 23 in which only a software failure is detected out of a software failure and a hardware failure. The number of occurrences of the failure D is the number of HDDs 23 in which a software failure and a hardware failure are detected.

A specific example of the maintenance procedure correspondence information will be described with reference to FIG. 13.

FIG. 13 is a diagram illustrating a specific example of the maintenance procedure correspondence information. In FIG. 13, a maintenance procedure correspondence table 1300 is an example of the maintenance procedure correspondence information and includes, for example, maintenance procedure information 1300-1 to 1300-7. Each maintenance procedure information 1300-1 to 1300-7 indicates a maintenance procedure used for the failure recovery in association with the combination of the number of occurrences of the failure B (NB), the number of occurrences of the failure C (NC), and the number of occurrences of the failure D (ND).

For example, the maintenance procedure information 1300-1 indicates a maintenance procedure "one time (software recovery×1, HDD exchange×1)" corresponding to the combination of the number of occurrences of the failure B (NB=1), the number of occurrences of the failure C (NC=1), and the number of occurrences of the failure D (ND=0). The maintenance procedure "one time (software recovery×1, HDD exchange×1)" indicates that the number of times of maintenance desired for the failure recovery is one time, and the software-based recovery measures may be performed one time and the HDD exchange may be performed one time in one maintenance.

For example, the maintenance procedure information 1300-3 indicates a maintenance procedure "two times (HDD exchange×1=>software recovery×1)" corresponding to the combination of the number of occurrences of the failure B (NB=0), the number of occurrences of the failure C (NC=1), and the number of occurrences of the failure D (ND=1). The maintenance procedure "two times (HDD exchange×1=>software recovery×1)" indicates that the number of times of maintenance desired for the failure recovery is two times, and after the HDD exchange is performed one time in the first maintenance, a failure reexamination is performed to update the software/hardware correspondence table 600, and then a software-based recovery measures may be performed one time in the second maintenance.

For example, the update unit 704 identifies a maintenance procedure corresponding to the combination of the calculated NB, NC, and ND by referring to the maintenance procedure correspondence table 1300. For example, the combination of the calculated NB, NC, and ND is set as "(NB, NC, ND)=(1, 1, 0)". In this case, the update unit 704 identifies the maintenance procedure "one time (software recovery×1, HDD exchange×1)" corresponding to the combination of the number of occurrences of the failure B (NB=1), the number of occurrences of the failure C (NC=1), and the number of occurrences of the failure D (ND=0).

For example, the combination of the calculated NB, NC, and ND is set as "(NB, NC, ND)=(0, 1, 1)". In this case, the update unit 704 identifies the maintenance procedure "two times (HDD exchange×1=>software recovery×1)" corresponding to the combination of the number of occurrences of the failure B (NB=0), the number of occurrences of the failure C (NC=1), and the number of occurrences of the failure D (ND=1).

The output unit 705 outputs the identified maintenance procedure. For example, the output unit 705 may transmit a fault occurrence report to the manager terminal 202 illustrated in FIG. 2. The fault occurrence report is information notified to the manager of the distributed storage 20i and includes the identified maintenance procedure.

For example, according to the maintenance procedure "one time (software recovery×1, HDD exchange×1)", the manager of the distributed storage 20i knows that it is desirable to perform the software-based recovery measures on the HDD 23 corresponding to the missing piece in the software log (during operation) and the exchange of the HDD 23 corresponding to the missing piece in the hardware log (during operation).

According to the maintenance procedure "two times (HDD exchange×1=>software recovery×1)", the manager of the distributed storage 20*i* knows that it is desirable to perform the exchange of the HDD 23 corresponding to the missing piece in the hardware log (during operation) in the first maintenance. Thereafter, the manager of the distributed storage 20*i* knows that it is desirable to perform the failure reexamination to update the software/hardware correspondence table 600 and then perform software-based recovery measures on the HDD 23 corresponding to the missing piece in the software log (during operation) in the second maintenance.

A specific example of the fault occurrence report notified to the manager of the distributed storage 20*i* will be described later with reference to FIG. 33.

The operation monitoring server 201 may receive a notification indicating that the maintenance is executed as a result of outputting the identified maintenance procedure (for example, the fault occurrence report). For example, the operation monitoring server 201 receives, from the manager terminal 202, a maintenance execution notification indicating that the maintenance indicated by the output fault occurrence report (for example, first maintenance), is executed.

When the maintenance execution notification is received, the operation monitoring server 201 may update the software/hardware correspondence table 600. For example, the first acquisition unit 701 acquires the software log (during operation) related to the distributed storage 20*i* in response to reception of the maintenance execution notification. The second acquisition unit 702 acquires the hardware log (during operation) related to the distributed storage 20*i* in response to reception of the maintenance execution notification. The update unit 704 updates the correspondence relationship between the SAS number (software) and the SAS number (hardware) in the generated correspondence information based on the SAS number (software) of the failure location identified based on the acquired software log (during operation) and the SAS number (hardware) of the failure location identified based on the acquired hardware log (during operation).

As a result, every time the maintenance indicated by the fault occurrence report is executed, the operation monitoring server 201 may update the software/hardware correspondence table 600 to correct the correspondence relationship between the SAS number (software) and the SAS number (hardware).

In the above description, in determining a plurality of failures, the operation monitoring server 201 calculates the number of occurrences of new failure for each of the failures B, C, and D based on the result of comparing the software and hardware logs (during operation) with the latest software/hardware correspondence table 600, but the embodiment is not limited thereto. For example, the operation monitoring server 201 may calculate the number of occurrences of new failure for each of the failures B, C, and D based on the result of comparing the software and hardware logs (during operation) with the software/hardware correspondence table 600 (initial state) and determine the plurality of failures.

(Example of Update of Software/Hardware Correspondence Table 600)

An example of update of the software/hardware correspondence table 600 will be described. First, an example of update of the software/hardware correspondence table 600 when the failure D occurred will be described with reference to FIGS. 14 to 16.

FIG. 14 is a diagram (part 1) illustrating a specific example of the software and hardware logs (during operation). As illustrated in FIG. 14, the software log (during operation) 1401 indicates a correspondence relationship between the ID of the HDD 23 recognized by the distributed storage software 21*i* during the operation of the distributed storage 20*i* and the SAS number (software) of the slot to which the HDD 23 is attached.

In the software log (during operation) 1401, the HDD 23 whose ID is not recognized by the distributed storage software 21*i* due to a software-based or hardware-based failure is missing.

The hardware log (during operation) 1402 indicates a correspondence relationship between the SAS number (hardware) of the slot to which the HDD 23 is attached and the state of the HDD 23, which are recognized by the state monitoring hardware Mi during the operation of the distributed storage 20*i*.

In the hardware log (during operation) 1402, the HDD 23 in which a hardware-based failure occurred is missing. In the hardware log (during operation) 1402, "Available" is set as the state of the HDD 23 in which a software-based failure occurred.

FIGS. 15 and 16 are diagrams illustrating an example of update of the software/hardware correspondence table 600 when the failure D occurred. A case where the software/hardware correspondence table 600 is updated by comparing the software log (during operation) 1401 and the hardware log (during operation) 1402 illustrated in FIG. 14 with the software/hardware correspondence table 600 (initial state) illustrated in FIG. 6, will be described.

For example, the update unit 704 refers to the failure type table 1200 and calculates the number of occurrences of new failure in each of the failures B, C, and D based on the result of comparing the software and hardware logs (during operation) 1401 and 1402 with the software/hardware correspondence table 600 (initial state). (NB, NC, ND) is represented as "(NB, NC, ND)=(0, 0, 1)". As a result, the update unit 704 knows that the failure D (single failure) occurred one time.

The update unit 704 compares the software log (during operation) 1401 with a software part of the software/hardware correspondence table 600 (initial state) and identifies the ID of the HDD 23 that is missing. Here, the ID "2" of the HDD 23, which is missing, is identified. In this case, as illustrated in FIG. 15, the update unit 704 sets "x" for the failure state—software of the HDD 23 with the identified ID "2" in the software/hardware correspondence table 600 (temporary).

The software/hardware correspondence table 600 (temporary) indicates stored content of the software/hardware correspondence table 600 being updated.

The update unit 704 compares the hardware log (during operation) 1402 with a hardware part of the software/hardware correspondence table 600 (initial state) and identifies the SAS number (hardware) of the HDD 23 that is missing. Here, the SAS number (hardware) "UUUU" of the HDD 23, which is missing, is identified. In this case, as illustrated in FIG. 15, the update unit 704 sets "x" for the failure state—hardware of the HDD 23 with the identified SAS number (hardware) "UUUU" in the software/hardware correspondence table 600 (temporary).

Next, the update unit 704 determines whether or not the SAS number (software) of the failure location and the SAS number (hardware) of the failure location correspond to each other in the software/hardware correspondence table 600 (temporary). Here, the SAS number (software) "SAS-xxxx-scsi-cccc" of the failure location does not correspond to the SAS number (hardware) "UUUU" of the failure location.

In this case, as illustrated in FIG. 16, the update unit 704 replaces the SAS number (hardware) "UUUU" of the failure location with the SAS number (hardware) "RRRR" corresponding to the SAS number (software) "SAS-xxxx-scsi-cccc" of the failure location in the software/hardware correspondence table 600 (updated). The update unit 704 sets "D" for the identification corresponding to the ID of the failure location in the software/hardware correspondence table 600 (updated).

As a result, in a case where a failure position on the software side and a failure position on the hardware side are different from each other when the failure D occurred, it may be possible to correct the difference between the failure positions by fixing the failure position on the software side and aligning the failure position on the hardware side with the failure position on the software side. The software/hardware correspondence table 600 (updated) indicates stored content of the software/hardware correspondence table 600 after the update.

Next, an example of update of the software/hardware correspondence table 600 when the failure C occurred will be described with reference to FIGS. 17 to 19.

FIG. 17 is a diagram (part 2) illustrating a specific example of the software and hardware logs (during operation). As illustrated in FIG. 17, the software log (during operation) 1701 indicates a correspondence relationship between the ID of the HDD 23 recognized by the distributed storage software 21i during the operation of the distributed storage 20i and the SAS number (software) of the slot to which the HDD 23 is attached.

The hardware log (during operation) 1702 indicates a correspondence relationship between the SAS number (hardware) of the slot to which the HDD 23 is attached and the state of the HDD 23, which are recognized by the state monitoring hardware Mi during the operation of the distributed storage 20i. In the hardware log (during operation) 1702, "Available" is set as the state of the HDD 23 having the SAS number (hardware) "UUUU" in which a software-based failure occurred.

FIGS. 18 and 19 are diagrams illustrating an example of update of the software/hardware correspondence table 600 when the failure C occurred. A case where the software/hardware correspondence table 600 is updated by comparing the software log (during operation) 1701 and the hardware log (during operation) 1702 illustrated in FIG. 17 with the software/hardware correspondence table 600 (initial state) illustrated in FIG. 6, will be described.

For example, the update unit 704 refers to the failure type table 1200 and calculates the number of occurrences of new failure in each of the failures B, C, and D based on the result of comparing the software and hardware logs (during operation) 1701 and 1702 with the software/hardware correspondence table 600 (initial state). (NB, NC, ND) is represented as "(NB, NC, ND)=(0, 1, 0)". As a result, the update unit 704 knows that the failure C (single failure) occurred one time.

In this case, the update unit 704 compares the software log (during operation) 1701 with a software part of the software/hardware correspondence table 600 (initial state) and identifies the ID of the HDD 23 that is missing. Here, the ID "2" of the HDD 23, which is missing, is identified. In this case, as illustrated in FIG. 18, the update unit 704 sets "x" for the failure state—software of the HDD 23 with the identified ID "2" in the software/hardware correspondence table 600 (temporary).

The update unit 704 compares the hardware log (during operation) 1702 with a hardware part of the software/hardware correspondence table 600 (initial state) and identifies the SAS number (hardware) of the HDD 23 in which the state is "Available". Here, the SAS number (hardware) "UUUU" of the HDD 23, in which the state is "Available", is identified. In this case, as illustrated in FIG. 18, the update unit 704 sets "Available" for the state of the identified SAS number (hardware) "UUUU" in the software/hardware correspondence table 600 (temporary).

Next, the update unit 704 determines whether or not the SAS number (software) of the failure location and the SAS number (hardware) of the failure location correspond to each other in the software/hardware correspondence table 600 (temporary). Here, the SAS number (software) "SAS-xxxx-scsi-cccc" of the failure location does not correspond to the SAS number (hardware) "UUUU" of the failure location.

In this case, as illustrated in FIG. 19, the update unit 704 replaces the SAS number (hardware) "UUUU" of the failure location with the SAS number (hardware) "RRRR" corresponding to the SAS number (software) "SAS-xxxx-scsi-cccc" of the failure location in the software/hardware correspondence table 600 (updated). The update unit 704 sets "C" for the identification corresponding to the ID of the failure location in the software/hardware correspondence table 600 (updated).

As a result, in a case where a failure position on the software side and a failure position on the hardware side are different from each other when the failure C occurred, it may be possible to correct the difference between the failure positions by fixing the failure position on the software side and aligning the failure position on the hardware side with the failure position on the software side.

Next, an example of update of the software/hardware correspondence table 600 when the failure B occurred will be described with reference to FIGS. 20 to 22.

FIG. 20 is a diagram (part 3) illustrating a specific example of the software and hardware logs (during operation). As illustrated in FIG. 20, the software log (during operation) 2001 indicates a correspondence relationship between the ID of the HDD 23 recognized by the distributed storage software 21i during the operation of the distributed storage 20i and the SAS number (software) of the slot to which the HDD 23 is attached.

The hardware log (during operation) 2002 indicates a correspondence relationship between the SAS number (hardware) of the slot to which the HDD 23 is attached and the state of the HDD 23, which are recognized by the state monitoring hardware Mi during the operation of the distributed storage 20i.

FIGS. 21 and 22 are diagrams illustrating an example of update of the software/hardware correspondence table 600 when the failure B occurred. A case where the software/hardware correspondence table 600 is updated by comparing the software log (during operation) 2001 and the hardware log (during operation) 2002 illustrated in FIG. 20 with the software/hardware correspondence table 600 (initial state) illustrated in FIG. 6, will be described.

For example, the update unit 704 refers to the failure type table 1200 and calculates the number of occurrences of new failure in each of the failures B, C, and D based on the result of comparing the software and hardware logs (during operation) 2001 and 2002 with the software/hardware correspondence table 600 (initial state). (NB, NC, ND) is represented as "(NB, NC, ND)=(1, 0, 0)". As a result, the update unit 704 knows that the failure B (single failure) occurred one time.

In this case, the update unit 704 compares the hardware log (during operation) 2002 with a hardware part of the software/hardware correspondence table 600 (initial state) and identifies the SAS number (hardware) of the HDD 23 that is missing. Here, the SAS number (hardware) "UUUU" of the HDD 23, which is missing, is identified.

In this case, as illustrated in FIG. 21, the update unit 704 sets "x" for the failure state—hardware of the HDD 23 with the identified SAS number (hardware) "UUUU" in the software/hardware correspondence table 600 (temporary). However, in a case of the failure B, since the failure position on the software side is not identified, the replacement as in the failures C and D is not performed, and the failure position on the hardware side does not move. The update unit 704 sets "-" for the state of the identified SAS number (hardware) "UUUU" in the software/hardware correspondence table 600 (temporary).

Next, as illustrated in FIG. 22, the update unit 704 attaches a specific identifier "a" to the ID corresponding to the SAS number (hardware) "UUUU" of the failure location in the software/hardware correspondence table 600 (updated). The update unit 704 sets "B" for the identification corresponding to the ID of the failure location in the software/hardware correspondence table 600 (updated).

As a result, when the failure B occurred, it may be possible to attach the specific identifier "a" to the ID of the HDD 23 having the failure location.

Next, an example of use of the specific identifier "a" that is attached to the ID of the HDD 23 having the failure location will be described. For a location where the failure B is detected, when a failure (failure C or failure D) occurred on the software side after the failure is resolved, the previous failure B and a new failure (failure C or failure D) interfere with each other. In this case, when the failure position on the hardware side is replaced, the HDD 23 after the failure B is resolved may be identified by moving the specific identifier "a".

An example of update of the software/hardware correspondence table 600 when the failure D occurred after the failure B will be described with reference to FIGS. 23 to 26.

FIG. 23 is a diagram (part 4) illustrating a specific example of the software and hardware logs (during operation). As illustrated in FIG. 23, the software log (during operation) 2301 indicates a correspondence relationship between the ID of the HDD 23 recognized by the distributed storage software 21i during the operation of the distributed storage 20i and the SAS number (software) of the slot to which the HDD 23 is attached.

The hardware log (during operation) 2302 indicates a correspondence relationship between the SAS number (hardware) of the slot to which the HDD 23 is attached and the state of the HDD 23, which are recognized by the state monitoring hardware Mi during the operation of the distributed storage 20i.

FIGS. 24 to 26 are diagrams illustrating an example of update of the software/hardware correspondence table 600 when the failure D occurred after the failure B. As illustrated in FIG. 24, the software/hardware correspondence table 600 (after the failure is resolved) indicates a state in which the failure B with the ID "5a" is resolved and "O" is set for the identification that corresponds to the ID "5a" as compared with the state of the software/hardware correspondence table 600 (updated) illustrated in FIG. 22.

A case where the software/hardware correspondence table 600 is updated by comparing the software log (during operation) 2301 and the hardware log (during operation) 2302 illustrated in FIG. 23 with the software/hardware correspondence table 600 (after the failure is resolved) after the failure B is resolved illustrated in FIG. 24, will be described.

For example, the update unit 704 refers to the failure type table 1200 and calculates the number of occurrences of new failure in each of the failures B, C, and D based on the result of comparing the software and hardware logs (during operation) 2301 and 2302 with the software/hardware correspondence table 600 (after the failure is resolved). (NB, NC, ND) is represented as "(NB, NC, ND)=(0, 0, 1)". As a result, the update unit 704 knows that the failure D (single failure) occurred one time.

In this case, the update unit 704 compares the software log (during operation) 2301 with a software part of the software/hardware correspondence table 600 (after the failure is resolved) and identifies the ID of the HDD 23 that is missing. Here, the ID "5" of the HDD 23, which is missing, is identified. In this case, as illustrated in FIG. 25, the update unit 704 sets "x" for the failure state—software of the HDD 23 with the identified ID "5 (in FIG. 25, the specific identifier "a" is attached)" in the software/hardware correspondence table 600 (temporary).

The update unit 704 compares the hardware log (during operation) 2302 with a hardware part of the software/hardware correspondence table 600 (after the failure is resolved) and identifies the SAS number (hardware) of the HDD 23 that is missing. Here, the SAS number (hardware) "RRRR" of the HDD 23, which is missing, is identified. In this case, as illustrated in FIG. 25, the update unit 704 sets "x" for the failure state—hardware of the HDD 23 with the identified SAS number (hardware) "RRRR" in the software/hardware correspondence table 600 (temporary).

Next, the update unit 704 determines whether or not the SAS number (software) of the failure location and the SAS number (hardware) of the failure location correspond to each other in the software/hardware correspondence table 600 (temporary). Here, the SAS number (software) "SAS-xxxx-scsi-ffff" of the failure location does not correspond to the SAS number (hardware) "RRRR" of the failure location.

In this case, as illustrated in FIG. 26, the update unit 704 replaces the SAS number (hardware) "RRRR" of the failure location with the SAS number (hardware) "UUUU" corresponding to the SAS number (software) "SAS-xxxx-scsi-ffff" of the failure location in the software/hardware correspondence table 600 (updated).

At this time, the update unit 704 moves the specific identifier "a", which is attached to the ID "5", to the ID "2" corresponding to the SAS number (hardware) "RRRR" of the failure location before the replacement. The update unit 704 moves the identification "O" corresponding to the ID "5" to the identification corresponding to the SAS number (hardware) "RRRR" of the failure location before the replacement in the software/hardware correspondence table 600 (updated). The update unit 704 sets "D" for the identification that corresponds to the ID "5" of the failure location.

As described above, when the failure D occurred after the failure B is resolved, the failure position on the hardware side may be aligned with the failure position on the software side, and the specific identifier "a" may be moved to the ID "2" corresponding to the SAS number (hardware) "RRRR" of the failure location before the replacement. As a result, it may be possible to correct the difference between the failure positions and to identifiably manage the HDD 23 in which the failure B occurred and the HDD exchange is performed. Even after that, every time the failure C or the failure D occurs and interference occurs between the previous failure B and a new failure (the failure C or the failure D), the management after the failure B is resolved may be continued by moving the specific identifier "a".

Next, an example of update of the software/hardware correspondence table 600 when a plurality of failures occurred will be described with reference to FIGS. 27 to 31.

FIG. 27 is a diagram (part 5) illustrating a specific example of the software and hardware logs (during operation). In FIG. 27, the software log (during operation) 2701 indicates a correspondence relationship between the ID of the HDD 23 recognized by the distributed storage software 21i during the operation of the distributed storage 20i and the SAS number (software) of the slot to which the HDD 23 is attached.

The hardware log (during operation) 2702 indicates a correspondence relationship between the SAS number (hardware) of the slot to which the HDD 23 is attached and the state of the HDD 23, which are recognized by the state monitoring hardware Mi during the operation of the distributed storage 20i.

FIGS. 28 to 31 are diagrams illustrating an example of update of the software/hardware correspondence table 600 when a plurality of failures occurred. A case where the software/hardware correspondence table 600 is updated by comparing the software log (during operation) 2701 and the hardware log (during operation) 2702 illustrated in FIG. 27 with the software/hardware correspondence table 600 (initial state) illustrated in FIG. 6, will be described.

For example, the update unit 704 refers to the failure type table 1200 and calculates the number of occurrences of new failure in each of the failures B, C, and D based on the result of comparing the software and hardware logs (during operation) 2701 and 2702 with the software/hardware correspondence table 600 (initial state). (NB, NC, ND) is represented as "(NB, NC, ND)=(0, 1, 1)". As a result, the update unit 704 knows that the failures C and D (a plurality of failures) each occurred one time.

In this case, the update unit 704 compares the software log (during operation) 2701 with a software part of the software/hardware correspondence table 600 (initial state) and identifies the ID of the HDD 23 that is missing. Here, the IDs "4, 7" of the HDDs 23, which are missing, are identified. In this case, as illustrated in FIG. 28, the update unit 704 sets "x" for the failure state—software of the HDDs 23 with the identified IDs "4, 7" in the software/hardware correspondence table 600 (temporary).

The update unit 704 compares the hardware log (during operation) 2702 with a hardware part of the software/hardware correspondence table 600 (initial state) and identifies the SAS number (hardware) of the HDD 23 that is missing. Here, the SAS number (hardware) "UUUU" of the HDD 23, which is missing, is identified. In this case, as illustrated in FIG. 28, the update unit 704 sets "x" for the failure state—hardware of the HDD 23 with the identified SAS number (hardware) "UUUU" in the software/hardware correspondence table 600 (temporary). The update unit 704 sets "-" for the state of the identified SAS number (hardware) "UUUU" in the software/hardware correspondence table 600 (temporary).

The update unit 704 compares the hardware log (during operation) 2702 with a hardware part of the software/hardware correspondence table 600 (initial state) and identifies the SAS number (hardware) of the HDD 23 in which the state is "Available". Here, the SAS number (hardware) "QQQQ" of the HDD 23, in which the state is "Available", is identified. In this case, as illustrated in FIG. 28, the update unit 704 sets "Available" for the state of the identified SAS number (hardware) "QQQQ" in the software/hardware correspondence table 600 (temporary).

In this case, the failures C and D (a plurality of failures) each occurred one time, and it is not uniquely determined which location of event occurrence in the software/hardware correspondence table 600 (temporary) corresponds to each of the failures C and D. Therefore, for example, the update unit 704 identifies a maintenance procedure corresponding to the combination of the calculated NB, NC, and ND by referring to the maintenance procedure correspondence table 1300 illustrated in FIG. 13.

A combination of the calculated NB, NC, and ND is "(NB, NC, ND)=(0, 1, 1)". Therefore, the update unit 704 identifies the maintenance procedure "two times (HDD exchange×1=>software recovery×1)" corresponding to the combination of the number of occurrences of the failure B (NB=0), the number of occurrences of the failure C (NC=1), and the number of occurrences of the failure D (ND=1).

The output unit 705 outputs a fault occurrence report including the identified maintenance procedure "two times (HDD exchange×1=>software recovery×1)". In this case, first, the manager of the distributed storage 20i performs an exchange of the HDD 23 corresponding to the missing piece in the hardware log (during operation) 2702 to resolve the failure D.

After the failure D is resolved, the manager of the distributed storage 20i transmits the maintenance execution notification from the manager terminal 202 to the operation monitoring server 201, for example. Upon receiving the maintenance execution notification, the operation monitoring server 201 acquires the software and hardware logs (reexamination) related to the distributed storage 20i and updates the software/hardware correspondence table 600.

The software and hardware logs (reexamination) after the failure D is resolved will be described with reference to FIG. 32.

FIG. 32 is a diagram illustrating a specific example of the software and hardware logs (reexamination). In FIG. 32, the software log (reexamination) 3201 indicates a correspondence relationship between the ID of the HDD 23 recognized by the distributed storage software 21i after the failure D is resolved and the SAS number (software) of the slot to which the HDD 23 is attached.

The hardware log (reexamination) 3202 indicates a correspondence relationship between the SAS number (hardware) of the slot to which the HDD 23 is attached and the state of the HDD 23, which are recognized by the state monitoring hardware Mi after the failure D is resolved.

The update unit 704 updates the software/hardware correspondence table 600 by comparing the software log (reexamination) 3201 and the hardware log (reexamination) 3202 illustrated in FIG. 32 with the software/hardware correspondence table 600 (temporary) illustrated in FIG. 28.

For example, the update unit 704 refers to the failure type table 1200 and calculates the number of occurrences of new failure in each of the failures B, C, and D based on the result of comparing the software and hardware logs (reexamination) 3201 and 3202 with the software/hardware correspondence table 600 (temporary). Here, (NB, NC, ND) is represented as "(NB, NC, ND)=(0, 1, 0)". As a result, the update unit 704 knows that the failure C (single failure) occurred one time.

In this case, the update unit 704 compares the software log (reexamination) 3201 with the failure state—software of the software/hardware correspondence table 600 (temporary) and identifies the ID of the recovered HDD 23. Here, the ID "4" of the HDD 23, which is recovered, is identified. In this case, as illustrated in FIG. 29, the update unit 704 sets "o"

for the failure state—software of the HDD 23 with the identified ID "4" in the software/hardware correspondence table 600 (temporary 2).

The update unit 704 compares the hardware log (reexamination) 3202 with the failure state—hardware in the software/hardware correspondence table 600 (temporary) and identifies the SAS number (hardware) of the recovered HDD 23. Here, the SAS number (hardware) "UUUU" of the HDD 23, which is recovered, is identified. In this case, as illustrated in FIG. 29, the update unit 704 sets "o" for the failure state—hardware of the HDD 23 with the identified SAS number (hardware) "UUUU" in the software/hardware correspondence table 600 (temporary 2).

Next, the update unit 704 determines whether or not the SAS number (software) of the recovered location and the SAS number (hardware) of the recovered location correspond to each other in the software/hardware correspondence table 600 (temporary 2). In this case, the SAS number (software) "SAS-xxxx-scsi-eeee" of the recovered location does not correspond to the SAS number (hardware) "UUUU" of the recovered location.

In this case, as illustrated in FIG. 30, the update unit 704 replaces the SAS number (hardware) "UUUU" of the recovered location with the SAS number (hardware) "TTTT" corresponding to the SAS number (software) "SAS-xxxx-scsi-eeee" of the recovered location in the software/hardware correspondence table 600 (temporary 3). The update unit 704 sets "O" for the identification corresponding to the ID "4" of the recovered location in the software/hardware correspondence table 600 (temporary 3).

The update unit 704 also determines whether or not the SAS number (software) of the failure location and the SAS number (hardware) of the failure location correspond to each other in the software/hardware correspondence table 600 (temporary 2). In this case, the SAS number (software) "SAS-xxxx-scsi-hhhh" of the failure location does not correspond to the SAS number (hardware) "QQQQ" of the failure location.

In this case, as illustrated in FIG. 30, the update unit 704 replaces the SAS number (hardware) "QQQQ" of the failure location with the SAS number (hardware) "WWWW" corresponding to the SAS number (software) "SAS-xxxx-scsi-hhhh" of the failure location in the software/hardware correspondence table 600 (temporary 3). The update unit 704 sets "C" for the identification corresponding to the ID "7" of the failure location in the software/hardware correspondence table 600 (temporary 3).

The manager of the distributed storage 20i performs, for example, a software-based recovery measures for the HDD 23 corresponding to the missing piece in the software log (reexamination) 3201 to resolve the failure C. After the failure C is resolved, as illustrated in FIG. 31, "O" is set for the identification corresponding to the ID "7" of the recovered location in the software/hardware correspondence table 600 (updated).

(Specific Example of Fault Occurrence Report)

A specific example of the fault occurrence report notified to the manager of the distributed storage 20i will be described with reference to FIG. 33.

FIG. 33 is a diagram illustrating a specific example of the fault occurrence report. The fault occurrence report 3300 in FIG. 33 is an example of a maintenance procedure notified to the manager of the distributed storage 20i. According to the fault occurrence report 3300, the manager knows that a plurality of failures (failure B: 1 location, failure C: 10 locations, failure D: 10 locations) of the HDD 23 occurred.

According to the fault occurrence report 3300, the manager may identify the maintenance procedure used for failure recovery. For example, first, the manager performs exchange of the HDD 23 corresponding to the missing piece in the hardware log. Next, by giving an instruction to reexamine the failure state, the manager updates the software and hardware logs and the software/hardware correspondence table 600.

The manager performs the software-based recovery measures for the HDD 23 corresponding to the missing piece in the software log, and when the result is NG, the manager performs the HDD exchange. Next, by giving an instruction to reexamine the failure state again, the manager updates the software and hardware logs and the software/hardware correspondence table 600. Thereafter, the manager checks that the failure in the HDD 23 is resolved.

(Operation Monitoring Processing of Operation Monitoring Server 201)

Next, the operation monitoring processing of the operation monitoring server 201 will be described. First, first operation monitoring processing of the operation monitoring server 201 is described with reference to FIG. 34. For example, first operation monitoring processing is executed when the operation monitoring of the distributed storage 20i is started.

Figure 34:
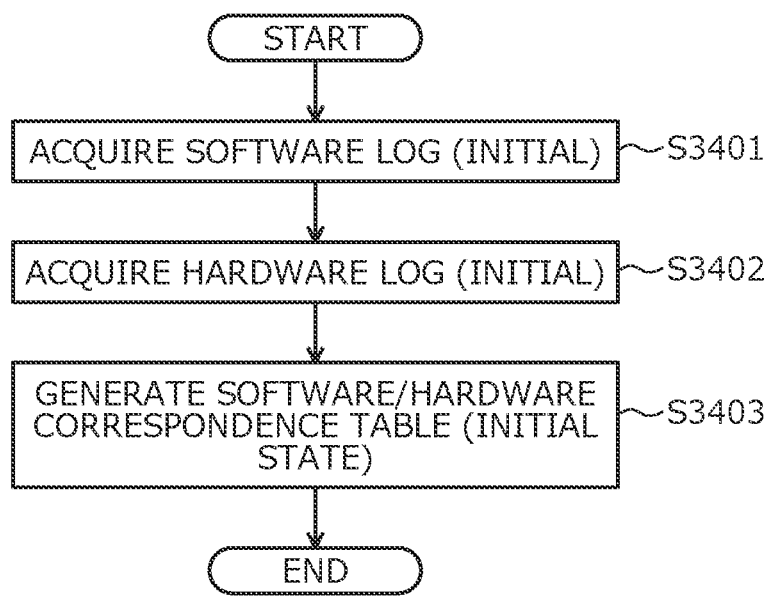
FIG. 34 is a flowchart illustrating an example of first operation monitoring processing of the operation monitoring server.

FIG. 34 is a flowchart illustrating an example of the first operation monitoring processing of the operation monitoring server 201. According to the flowchart in FIG. 34, first, the operation monitoring server 201 acquires the software log (initial) related to the distributed storage 20i (step S3401). Next, the operation monitoring server 201 acquires the hardware log (initial) related to the distributed storage 20i (step S3402).

For example, the processing in step S3401 is performed based on the first HDD information (initial) and the second HDD information (initial) obtained by transmitting the failure status examination instruction to the OS 22i of the storage server Si and the distributed storage software 21i. For example, the processing in step S3402 is performed by transmitting the failure status examination instruction to each of the state monitoring hardware Mi. The processing in steps S3401 and S3402 may be executed in reverse order or may be executed in parallel.

Based on the acquired software log (initial) and the hardware log (initial), the operation monitoring server 201 generates the software/hardware correspondence table 600 (initial state) (step S3403) and ends a series of processing according to the present flowchart.

As a result, the operation monitoring server 201 may generate the software/hardware correspondence table 600 (initial state) in which the SAS number (software) and the SAS number (hardware) of the HDD 23 used for the distributed storage 20i are temporarily associated with each other.

Next, second operation monitoring processing of the operation monitoring server 201 is described with reference to FIG. 35. For example, the second operation monitoring processing is executed periodically or in response to an instruction from the manager terminal 202 during the operation of the distributed storage 20i.

Figure 35:
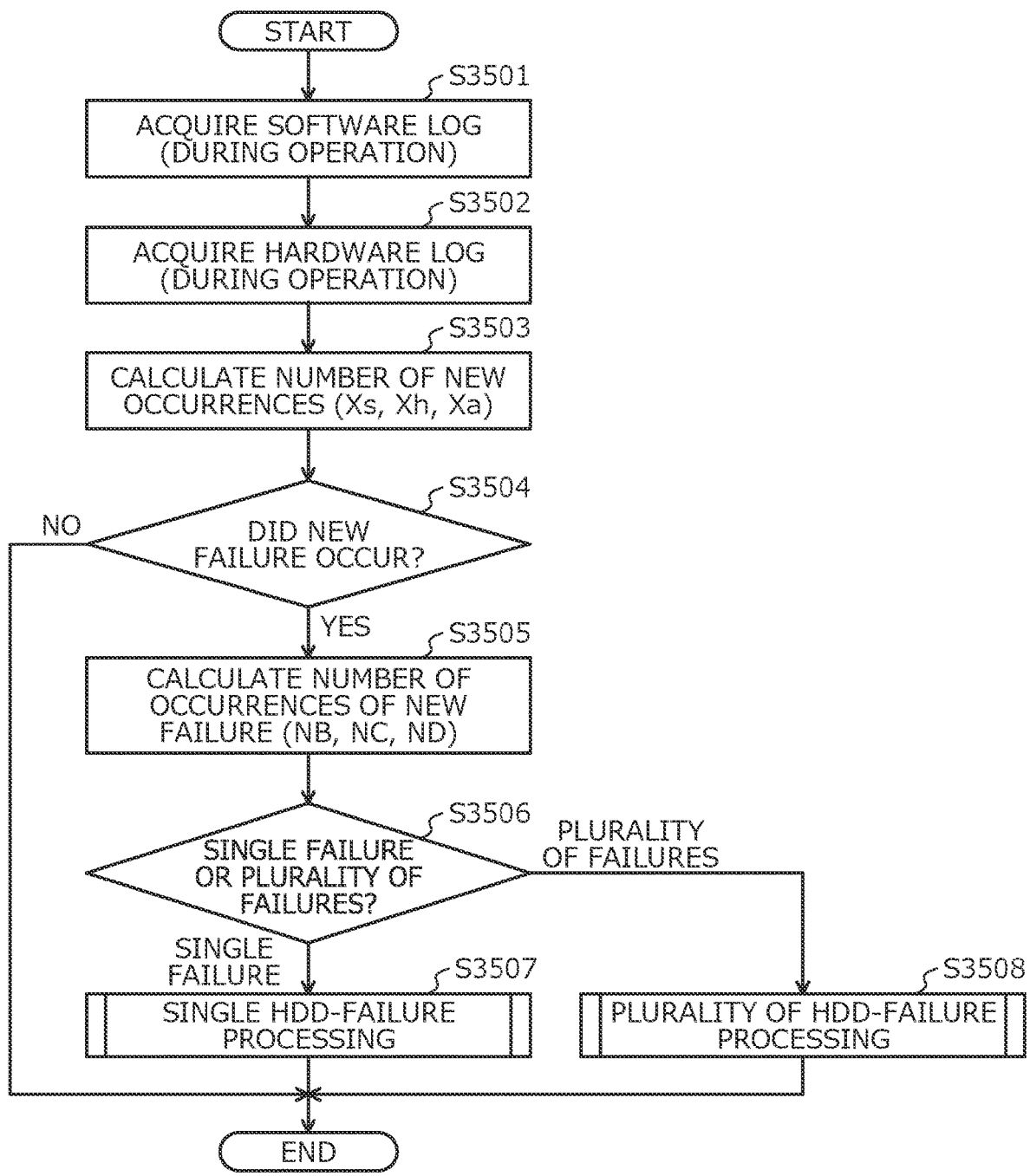
FIG. 35 is a flowchart illustrating an example of second operation monitoring processing of the operation monitoring server.

FIG. 35 is a flowchart illustrating an example of the second operation monitoring processing of the operation monitoring server 201. According to the flowchart in FIG. 35, first, the operation monitoring server 201 acquires the software log (during operation) related to the distributed storage 20i (step S3501). Next, the operation monitoring server 201 acquires the hardware log (during operation) related to the distributed storage 20*i* (step S3502).

For example, the processing in step S3501 is performed based on the first HDD information (during operation) and the second HDD information (during operation) obtained by transmitting the failure status examination instruction to the OS 22*i* of the storage server Si and the distributed storage software 21*i*. For example, the processing in step S3502 is performed by transmitting the failure status examination instruction to each of the state monitoring hardware Mi. The processing in steps S3501 and S3502 may be executed in reverse order or may be executed in parallel.

The operation monitoring server 201 calculates the number of new occurrences (Xs, Xh, Xa) for each of the events based on the result of comparing the software and hardware logs (during operation) with the software/hardware correspondence table 600 (step S3503). The software/hardware correspondence table 600 to be compared is the latest software/hardware correspondence table 600.

Next, the operation monitoring server 201 determines whether or not a new failure occurred based on the calculated number of new occurrences (Xs, Xh, Xa) (step S3504). For example, in a case of "(Xs, Xh, Xa)=(0, 0, 0)", the operation monitoring server 201 determines that a new failure did not occur. In a case of "(Xs, Xh, Xa)≠(0, 0, 0)", the operation monitoring server 201 determines that a new failure occurred.

When no new failure occurred (step S3504: No), the operation monitoring server 201 ends a series of processing according to the present flowchart.

On the other hand, when a new failure occurred (step S3504: Yes), the operation monitoring server 201 calculates the number of occurrences of new failure (NB, NC, ND) for each of the failures B, C, and D based on the calculated number of new occurrences (Xs, Xh, Xa) (step S3505). The operation monitoring server 201 determines whether the HDD 23 has a single failure or a plurality of failures based on the calculated number of occurrences of new failure (NB, NC, ND) (step S3506).

When the HDD 23 has a single failure (step S3506: single failure), the operation monitoring server 201 executes single HDD-failure processing (step S3507) and ends a series of processing according to the present flowchart. The single HDD-failure processing will be described later with reference to FIGS. 36 and 37.

On the other hand, when the HDD 23 has a plurality of failures (step S3506: plurality of failures), the operation monitoring server 201 executes a plurality of HDD-failure processing (step S3508) and ends a series of processing according to the present flowchart. The plurality of HDD-failure processing will be described later with reference to FIG. 38.

As a result, when a new failure occurred, the operation monitoring server 201 may execute the single HDD-failure processing or the plurality of HDD-failure processing depending on whether a single failure occurred or a plurality of failures occurred.

Next, the single HDD-failure processing in step S3507 will be described with reference to FIGS. 36 and 37.

Figure 36:
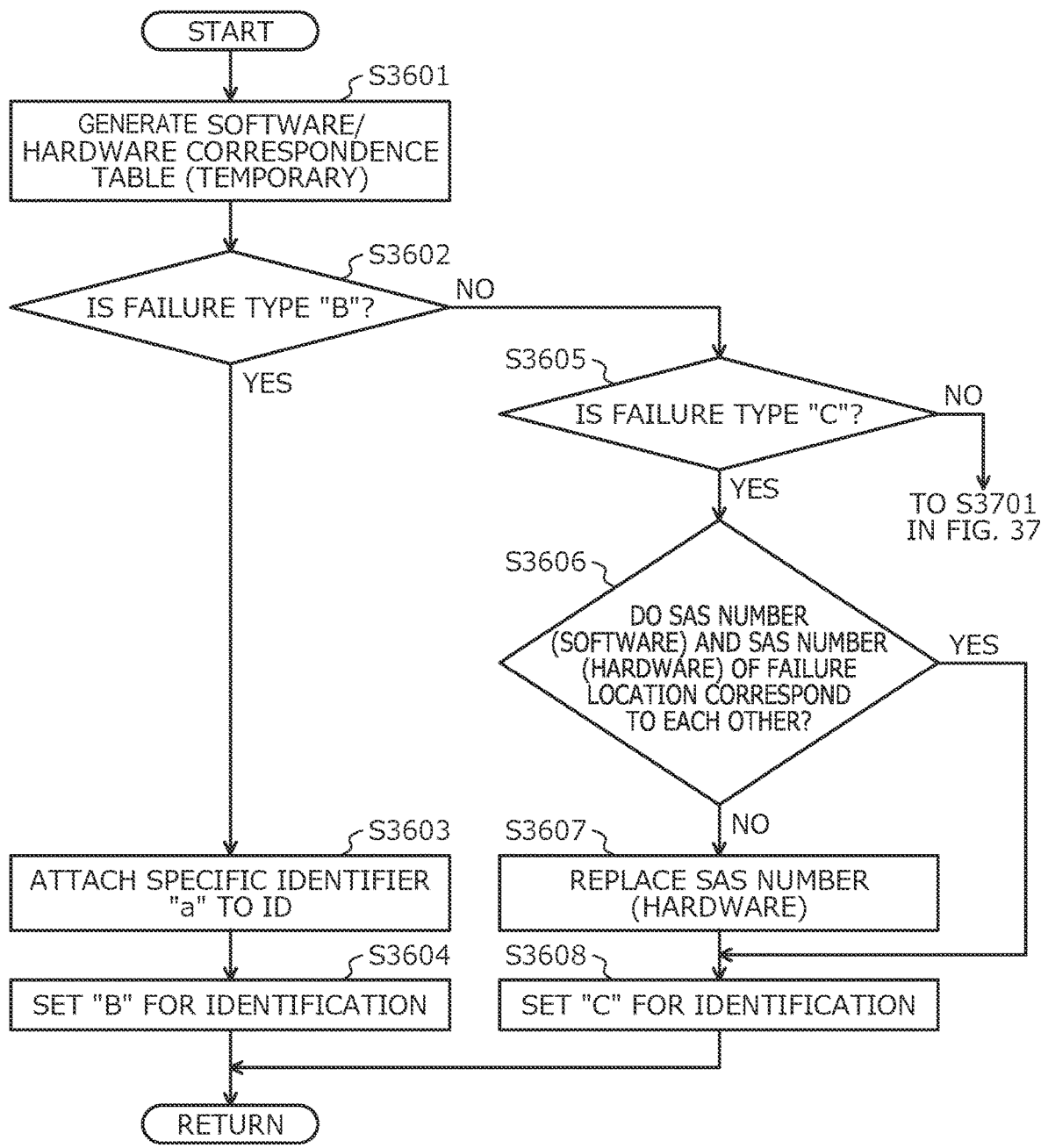
FIG. 36 is a flowchart (part 1) illustrating an example of single HDD-failure processing.
Figure 37:
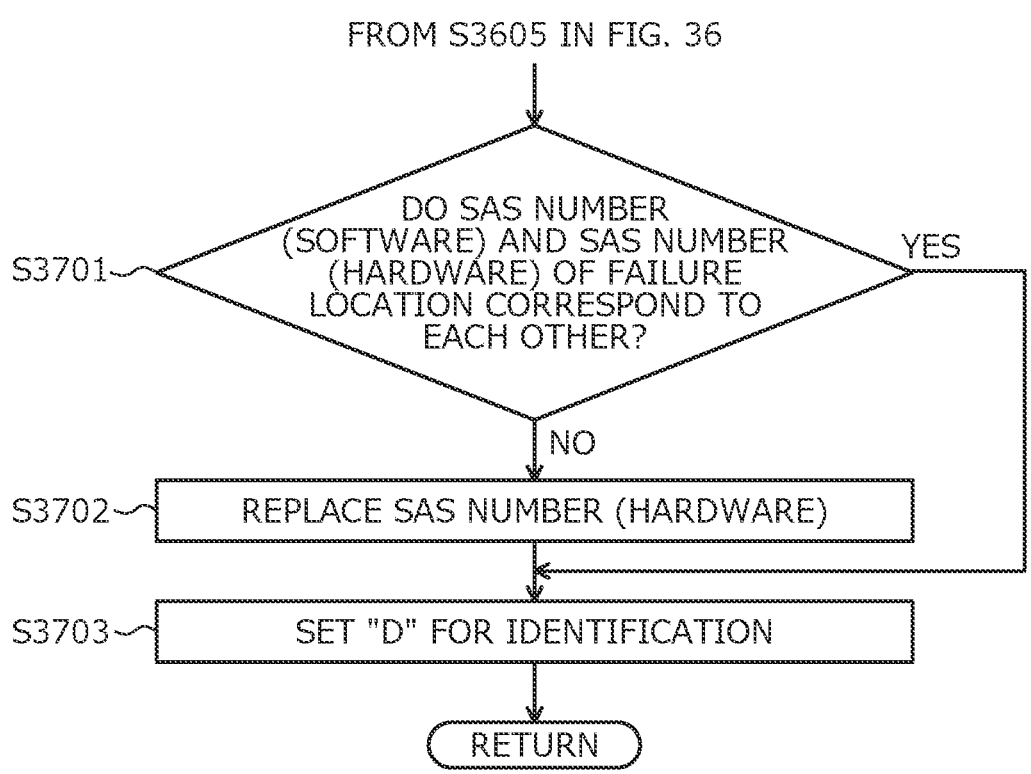
FIG. 37 is a flowchart (part 2) illustrating an example of the single HDD-failure processing.

FIGS. 36 and 37 are flowcharts illustrating an example of the single HDD-failure processing. According to the flowchart illustrated in FIG. 36, first, the operation monitoring server 201 generates the software/hardware correspondence table 600 (temporary) based on the result of comparing the software and hardware logs (during operation) with the software/hardware correspondence table 600 (step S3601).

For example, the software/hardware correspondence table 600 (temporary) may be generated at the time of calculating the number of new occurrences (Xs, Xh, Xa) in step S3503 illustrated in FIG. 35.

Next, the operation monitoring server 201 determines whether or not the failure type is "B" (step S3602). When the failure type is "B" (step S3602: Yes), the operation monitoring server 201 attaches the specific identifier "a" to the ID corresponding to the SAS number (hardware) of the failure location in the software/hardware correspondence table 600 (temporary) (step S3603).

Thereafter, the operation monitoring server 201 sets "B" for the identification corresponding to the ID of the failure location in the software/hardware correspondence table 600 (temporary) (step S3604) and makes the process to return to the step in which the single HDD-failure processing is invoked.

As a result, when the failure B occurred, it may be possible to manage the HDD 23 in which the failure B occurred by attaching the specific identifier "a" to the ID of the HDD 23 having the failure location.

In step S3602, when the failure type is not "B" (step S3602: No), the operation monitoring server 201 determines whether or not the failure type is "C" (step S3605). When the failure type is "C" (step S3605: Yes), the operation monitoring server 201 determines whether or not the SAS number (software) of the failure location and the SAS number (hardware) of the failure location correspond to each other in the software/hardware correspondence table 600 (temporary) (step S3606).

When the SAS number (software) of the failure location and the SAS number (hardware) of the failure location correspond to each other (step S3606: Yes), the operation monitoring server 201 makes the process to proceed to step S3608.

On the other hand, when the SAS number (software) of the failure location and the SAS number (hardware) of the failure location do not correspond to each other (step S3606: No), the operation monitoring server 201 replaces the SAS number (hardware) of the failure location with the SAS number (hardware) corresponding to the SAS number (software) of the failure location (step S3607).

For example, in a case where the SAS number (hardware) of the failure location is replaced, when the specific identifier "a" is attached to the ID to be replaced, the operation monitoring server 201 moves the specific identifier "a" to the ID of the source in the replacement.

Thereafter, the operation monitoring server 201 sets "C" for the identification corresponding to the ID of the failure location in the software/hardware correspondence table 600 (temporary) (step S3608) and makes the process to return to the step in which the single HDD-failure processing is invoked.

As a result, when the failure C occurred, it may be possible to correct the correspondence relationship between the SAS number (software) and the SAS number (hardware) in the software/hardware correspondence table 600 by fixing the failure position on the software side and aligning the failure position on the hardware side with the failure position on the software side.

In step S3605, when the failure type is not "C" (step S3605: No), the operation monitoring server 201 makes the process to proceed to step S3701 illustrated in FIG. 37.

In the flowchart illustrated in FIG. 37, first, the operation monitoring server 201 determines whether or not the SAS number (software) of the failure location and the SAS number (hardware) of the failure location correspond to each other in the software/hardware correspondence table 600 (temporary) (step S3701).

When the SAS number (software) of the failure location and the SAS number (hardware) of the failure location correspond to each other (step S3701: Yes), the operation monitoring server 201 makes the process to proceed to step S3703.

On the other hand, when the SAS number (software) of the failure location and the SAS number (hardware) of the failure location do not correspond to each other (step S3701: No), the operation monitoring server 201 replaces the SAS number (hardware) of the failure location with the SAS number (hardware) corresponding to the SAS number (software) of the failure location (step S3702).

Thereafter, the operation monitoring server 201 sets "D" for the identification corresponding to the ID of the failure location in the software/hardware correspondence table 600 (temporary) (step S3703) and makes the process to return to the step in which the single HDD-failure processing is invoked.

As a result, when the failure D occurred it may be possible to correct the correspondence relationship between the SAS number (software) and the SAS number (hardware) in the software/hardware correspondence table 600 by fixing the failure position on the software side and aligning the failure position on the hardware side with the failure position on the software side.

Next, the plurality of HDD-failure processing in step S3508 will be described with reference to FIG. 38.

Figure 38:
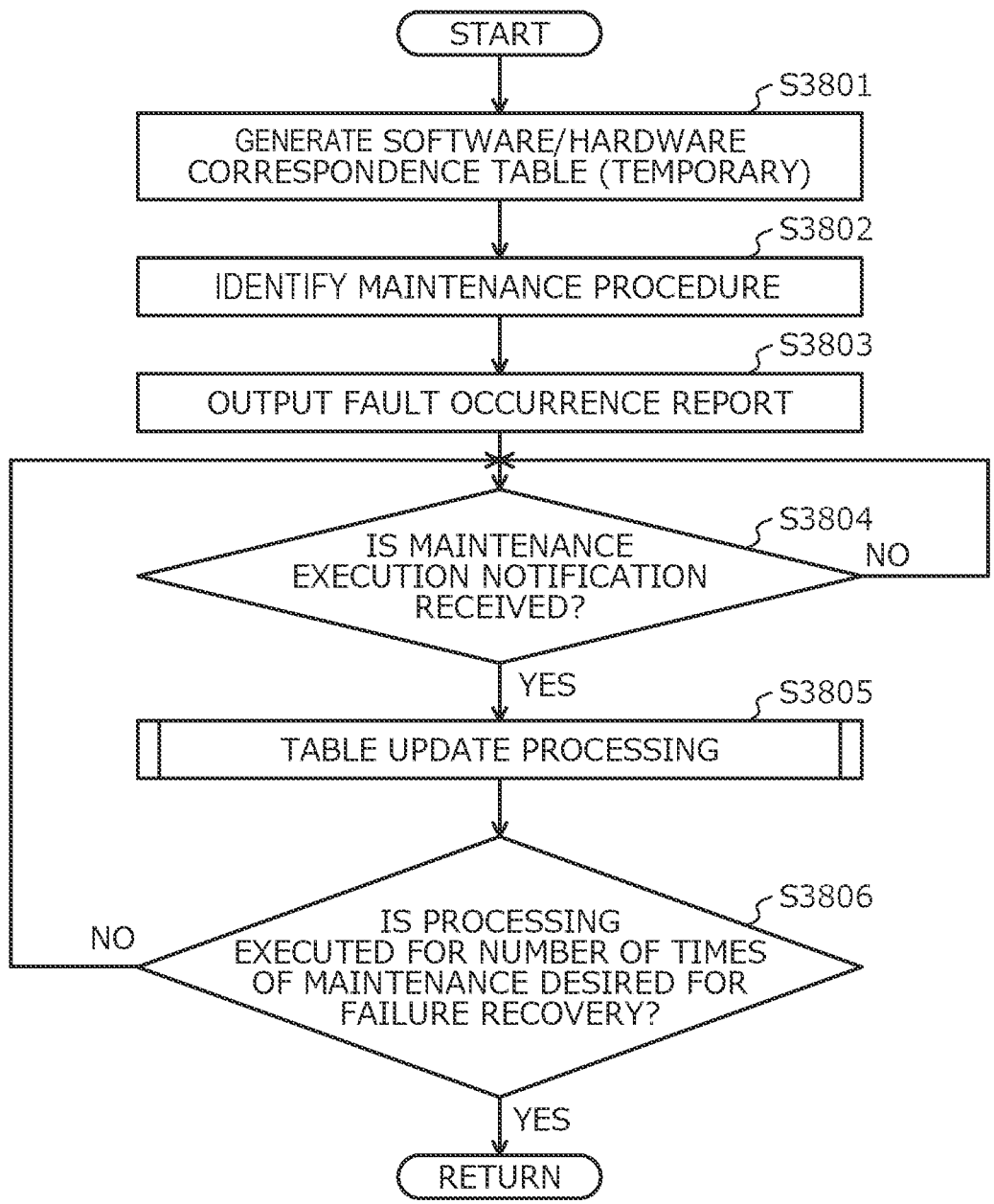
FIG. 38 is a flowchart illustrating an example of a plurality of HDD-failure processing.

FIG. 38 is a flowchart illustrating an example of the plurality of HDD-failure processing. According to the flowchart illustrated in FIG. 38, first, the operation monitoring server 201 generates the software/hardware correspondence table 600 (temporary) based on the result of comparing the software and hardware logs (during operation) with the software/hardware correspondence table 600 (step S3801).

For example, the software/hardware correspondence table 600 (temporary) may be generated at the time of calculating the number of new occurrences (Xs, Xh, Xa) in step S3503 illustrated in FIG. 35.

Next, the operation monitoring server 201 identifies a maintenance procedure corresponding to the combination of the calculated NB, NC, and ND by referring to the maintenance procedure correspondence table 1300 (step S3802). The operation monitoring server 201 outputs a fault occurrence report including the identified maintenance procedure (step S3803).

Next, the operation monitoring server 201 determines whether or not the maintenance execution notification is received (step S3804). The maintenance execution notification indicates that the maintenance (one maintenance) indicated by the fault occurrence report is executed. The operation monitoring server 201 waits for reception of the maintenance execution notification (step S3804: No).

When the maintenance execution notification is received (step S3804: Yes), the operation monitoring server 201 executes table update processing of updating the software/hardware correspondence table 600 (step S3805). The table update processing will be described later with reference to FIG. 39.

Next, the operation monitoring server 201 determines whether or not the table update processing is executed for the number of times of the maintenance desired for the failure recovery (step S3806). The number of times of the maintenance desired for the failure recovery is identified by using the maintenance procedure. When the processing is not executed for the number of times of the maintenance desired for the failure recovery (step S3806: No), the operation monitoring server 201 makes the process to return to step S3804.

On the other hand, when the processing is executed for the number of times of the maintenance desired for the failure recovery (step S3806: Yes), the operation monitoring server 201 makes the process to return to the step in which the plurality of HDD-failure processing is invoked.

As a result, when a plurality of failures in the HDD 23 occurred, it may be possible to output the maintenance procedure used for the failure recovery. Every time the maintenance that is indicated by the fault occurrence report is executed, the software/hardware correspondence table 600 may be updated and the correspondence relationship between the SAS number (software) and the SAS number (hardware) may be corrected.

Next, the table update processing in step S3805 will be described with reference to FIG. 39.

Figure 39:
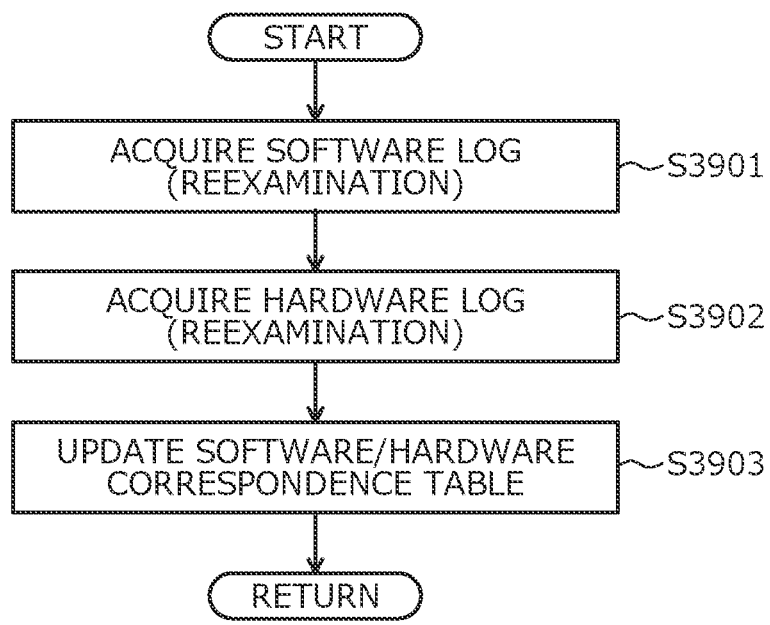
FIG. 39 is a flowchart illustrating an example of a table update processing.

FIG. 39 is a flowchart illustrating an example of the table update processing. According to the flowchart in FIG. 39, first, the operation monitoring server 201 acquires the software log (reexamination) related to the distributed storage 20*i* (step S3901). Next, the operation monitoring server 201 acquires the hardware log (reexamination) related to the distributed storage 20*i* (step S3902).

For example, the processing in step S3901 is performed based on the first HDD information (reexamination) and the second HDD information (reexamination) obtained by transmitting the failure status examination instruction to the OS 22*i* of the storage server Si and the distributed storage software 21*i*. For example, the processing in step S3902 is performed by transmitting the failure status examination instruction to each of the state monitoring hardware Mi. The processing in steps S3901 and S3902 may be executed in reverse order or may be executed in parallel.

The operation monitoring server 201 compares the software and hardware logs (reexamination) with the software/hardware correspondence table 600 (temporary), updates the software/hardware correspondence table 600 (step S3903), and makes the process to return to the step in which the table update processing is invoked.

As a result, every time the maintenance indicated by the fault occurrence report is executed and the failure is resolved, the stored content of the software/hardware correspondence table 600 may be updated.

As described above, with the operation monitoring server 201 according to the embodiment, it may be possible to acquire the software log (initial) related to the distributed storage 20*i*, acquire the hardware log (initial) related to the distributed storage 20*i* from the state monitoring hardware Mi, and generate the software/hardware correspondence table 600 (initial state) based on the acquired software log (initial) and the hardware log (initial).

As a result, it may be possible to generate the software/hardware correspondence table 600 (initial state) in which the SAS number (software) and the SAS number (hardware) of the HDD 23 used for the distributed storage 20*i* are temporarily associated with each other.

According to the operation monitoring server 201, during the operation of the distributed storage 20*i*, it may be possible to acquire the software log (during operation) related to the distributed storage 20*i* and acquire the hardware log (during operation) related to the distributed storage 20*i*. According to the operation monitoring server 201, it may be possible to update the correspondence relationship between the SAS number (software) and the SAS number (hardware) in the software/hardware correspondence table 600 (initial state) based on the result of comparing the software log (during operation) and the hardware log (during operation) with the software/hardware correspondence table 600 (initial state).

As a result, when a failure occurred in the HDD 23, the difference (contradiction) between the failure positions are corrected by comparing the failure location identified based on the software log (during operation) and the failure location identified based on the hardware log (during operation) so that it may be possible to easily identify the failure location.

According to the operation monitoring server 201, when the SAS number (software) of the failure location identified based on the software log (during operation) and the SAS number (hardware) of the failure location identified based on the hardware log (during operation) do not correspond to each other in the software/hardware correspondence table 600 (initial state), it may be possible to replace the SAS number of the failure location (hardware) with the SAS number (hardware) corresponding to the SAS number (software) of the failure location.

As a result, the difference between the failure positions may be corrected by aligning the failure position on the hardware side with the failure position on the software side. By fixing the failure position on the software side, the influence on other components due to the replacement of the SAS number may be reduced (for example, the changes may not be notified to the OS, application, or the like).

According to the operation monitoring server 201, when only a software failure is detected from the software log (during operation) and the hardware log (during operation), and the SAS number (hardware) of the failure location is replaced with the SAS number (hardware) corresponding to the SAS number (software) of the failure location, the failure type "C" may be set in association with the ID of the HDD 23 to be replaced.

As a result, it may be possible to determine the HDD 23 in which only a software failure is detected.

According to the operation monitoring server 201, when a software failure and a hardware failure are detected from the software log (during operation) and the hardware log (during operation), and the SAS number (hardware) of the failure location is replaced with the SAS number (hardware) corresponding to the SAS number (software) of the failure location, the failure type "D" may be set in association with the ID of the HDD 23 to be replaced.

As a result, it may be possible to determine the HDD 23 in which a software failure and a hardware failure are detected.

According to the operation monitoring server 201, when the SAS number (software) of the failure location is not identified based on the software log (during operation) but the SAS number (hardware) of the failure location is identified based on the hardware log (during operation), the specific identifier "a" may be attached to the ID corresponding to the SAS number (hardware) of the failure location in the software/hardware correspondence table 600 (initial state). The specific identifier "a" indicates that only a hardware failure is detected out of a software failure and a hardware failure.

As a result, the HDD 23 in which the failure B occurred may be managed in an identifiable manner.

According to the operation monitoring server 201, after the failure in the HDD 23 having the SAS number (hardware) of the failure location is resolved, when the SAS number (hardware) of the HDD 23 in which the failure is resolved is replaced with another SAS number (hardware) in the software/hardware correspondence table 600, it may be possible to move the specific identifier "a" to an ID corresponding to the another SAS number (hardware).

As a result, even when the SAS number (hardware) of the software/hardware correspondence table 600 is replaced, the location where the failure B occurred may be identified based on the specific identifier attached to the ID.

According to the operation monitoring server 201, it may be possible to calculate the number of failures B (NB), the number of failures C (NC), and the number of failures D (ND) based on the result of comparing the software log (during operation) and the hardware log (during operation) with the software/hardware correspondence table 600 (initial state). According to the operation monitoring server 201, it may be possible to determine whether the HDD 23 has a single failure or a plurality of failures based on the calculated number of failures B (NB), the calculated number of failures C (NC), and the calculated number of failures D (ND), and possible to update the correspondence relationship between the SAS number (software) and the SAS number (hardware) in the software/hardware correspondence table 600 (initial state) when the HDD 23 has a single failure.

As a result, when the difference between the failure positions may be appropriately corrected (single failure), it may be possible to update the software/hardware correspondence table 600 (initial state).

According to the operation monitoring server 201, when the HDD 23 has a plurality of failures, it may be possible to identify the maintenance procedure corresponding to the combination of the calculated number of failures B (NB), the calculated number of failures C (NC), and the calculated number of failures D (ND) by referring to the maintenance procedure correspondence table 1300, and possible to output the identified maintenance procedure.

As a result, when a plurality of failures occurred in the HDD 23, it may be possible to present the maintenance procedure used for the failure recovery in accordance with the number of occurrences of new failure for each of the failures B, C, and D.

According to the operation monitoring server 201, it may be possible to acquire the first HDD information (initial) from the distributed storage software 21*i* and acquire the second HDD information (initial) from the OS 22*i* of the storage server Si. According to the operation monitoring server 201, it may be possible to acquire the software log (initial) by creating the software log (initial) based on the acquired first HDD information (initial) and second HDD information (initial).

As a result, it may be possible to acquire the software log (initial) indicating a correspondence relationship between the ID of the HDD 23 and the SAS number (software) of the slot to which the HDD 23 is attached, in the initial state when the operation of the distributed storage 20*i* is started.

From the above, according to the operation monitoring server 201, it may be possible to easily manage the failure status of the HDD 23 by associating the SAS number (software) with the SAS number (hardware) to easily identify the failure location in the HDD 23. For example, even when the distributed storage software 21*i* and the state monitoring hardware Mi are separately developed, the operation monitoring server 201 may identify a failure location in the HDD 23 and manage a failure status.

The operation monitoring method described in the present embodiment may be implemented by a computer such as a personal computer or a workstation executing a program prepared in advance. The operation monitoring program according to the present embodiment is recorded on a computer-readable recording medium such as a hard disk, a flexible disk, a CD-ROM, a DVD, or a USB memory and is executed by being read by the computer from the recording medium. The present operation monitoring program may be distributed via a network such as the Internet.

The information processing apparatus 101 (operation monitoring server 201) described in the present embodiment may also be implemented with an integrated circuit (IC) for a specific application such as a standard cell or a structured application specific integrated circuit (ASIC), or with a programmable logic device (PLD) such as a FPGA.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing apparatus, comprising:
a memory; and
a processor coupled to the memory and the processor configured to:
acquire first information that indicates a correspondence relationship between a virtual identifier of a memory device included in a storage device and a first identifier of a slot to which the memory device is attached among slots included in the storage device, the virtual identifier being recognized by a storage control software for implementing a distributed storage by using memory devices included in the storage device, the first identifier being recognized by an operating system (OS) of the storage device;
acquire, from a state monitoring circuit that monitors a life-and-death state of the memory device, second information that indicates a correspondence relationship between a second identifier of a slot to which the memory device is attached and a state of the memory device, the second identifier being recognized by the state monitoring circuit;
generate correspondence information that indicates a correspondence relationship among the virtual identifier, the first identifier, and the second identifier based on the first information and the second information;
acquire, during an operation of the distributed storage, third information that indicates correspondence relationship between the virtual identifier and the first identifier;
acquire, during the operation of the distributed storage, fourth information that indicates correspondence relationship between the second identifier and the state of the memory device from the state monitoring circuit; and
update the correspondence relationship between the first identifier and the second identifier in the correspondence information, based on a result of comparing the third information and the fourth information with the correspondence information.

2. The information processing apparatus according to claim 1, wherein
the processor is further configured to:
when the first identifier of a failure location identified from the third information and the second identifier of a failure location identified from the fourth information do not correspond to each other in the correspondence information, replace the second identifier of the failure location identified from the fourth information with a second identifier that corresponds to the first identifier of the failure location identified from the third information.

3. The information processing apparatus according to claim 2, wherein
the processor is further configured to:
when the first identifier of the failure location identified from the third information does not exists and the second identifier of the failure location identified from the fourth information exists in the correspondence information, attach a specific identifier to a virtual identifier that corresponds to the second identifier of the failure location identified from the fourth information.

4. The information processing apparatus according to claim 3, wherein
the processor is further configured to:
after a failure in a memory device that corresponds to the second identifier of the failure location identified from the fourth information is resolved, when the second identifier of the failure location identified from the fourth information is replaced with another second identifier in the correspondence information, move the specific identifier to a virtual identifier that corresponds to the another second identifier.

5. The information processing apparatus according to claim 1, wherein
the processor is further configured to:
calculate a first number of memory devices in which only a hardware failure is detected, a second number of memory devices in which only a software failure is detected, and a third number of memory devices in which a software failure and a hardware failure are detected, based on the result of comparing the third information and the fourth information with the correspondence information;
determine whether the memory device has a single failure or a plurality of failures based on the calculated first number, second number, and the third number; and
update the correspondence relationship between the first identifier and the second identifier in the correspondence information when the memory device has a single failure.

6. The information processing apparatus according to claim 5, wherein
the processor is further configured to:
when the memory device has a plurality of failures, identify a maintenance procedure corresponding to a combination of the calculated first number, second number, and third number by referring information that indicates a maintenance procedure used for a failure recovery, in association with a combination of a number of memory devices in which only a hardware failure is detected, a number of memory devices in which only a software failure is detected, and a number of memory devices in which a software failure and a hardware failure are detected; and
output the identified maintenance procedure.

7. The information processing apparatus according to claim 1, wherein
the processor is further configured to:
acquire, from the storage control software, first correspondence information that indicates a correspondence relationship between a virtual identifier and a virtual device name, which are assigned to each memory device by the storage control software;
acquire, from the OS, second correspondence information that indicates a correspondence relationship between a virtual device name assigned to each memory device and a first identifier of a slot to which each memory device is attached among the slots included in the storage device; and
acquire the first information by creating the first information based on the first correspondence information and the second correspondence information.

8. The information processing apparatus according to claim 2, wherein
the processor is further configured to:
when only a software failure is detected from the third information and the fourth information and when the second identifier of the failure location identified from the fourth information is replaced with the second identifier that corresponds to the first identifier of the failure location, set information that indicates that only a software failure is detected, in association with a virtual identifier of the memory device to be replaced.

9. The information processing apparatus according to claim 2, wherein
the processor is further configured to:
when a software failure and a hardware failure are detected from the third information and the fourth information and when the second identifier of the failure location is replaced with the second identifier that corresponds to the first identifier of the failure location, set information that indicates that a software failure and a hardware failure are detected, in association with a virtual identifier of the memory device to be replaced.

10. The information processing apparatus according to claim 3, wherein
the specific identifier indicates that only a hardware failure is detected out of a software failure and a hardware failure.

11. A non-transitory computer-readable recording medium having stored therein a program that causes a computer to execute a process, the process comprising:
acquiring first information that indicates a correspondence relationship between a virtual identifier of a memory device included in a storage device and a first identifier of a slot to which the memory device is attached among slots included in the storage device, the virtual identifier being recognized by a storage control software for implementing a distributed storage by using memory devices included in the storage device, the first identifier being recognized by an operating system (OS) of the storage device;
acquiring, from a state monitoring circuit that monitors a life-and-death state of the memory device, second information that indicates a correspondence relationship between a second identifier of a slot to which the memory device is attached and a state of the memory device, the second identifier being recognized by the state monitoring circuit;
generating correspondence information that indicates a correspondence relationship among the virtual identifier, the first identifier, and the second identifier based on the first information and the second information;
acquiring, during an operation of the distributed storage, third information that indicates correspondence relationship between the virtual identifier and the first identifier;
acquiring, during the operation of the distributed storage, fourth information that indicates correspondence relationship between the second identifier and the state of the memory device from the state monitoring circuit; and
updating the correspondence relationship between the first identifier and the second identifier in the correspondence information, based on a result of comparing the third information and the fourth information with the correspondence information.

12. A method of monitoring an operation, the method comprising:
acquiring, by a computer, first information that indicates a correspondence relationship between a virtual identifier of a memory device included in a storage device and a first identifier of a slot to which the memory device is attached among slots included in the storage device, the virtual identifier being recognized by a storage control software for implementing a distributed storage by using memory devices included in the storage device, the first identifier being recognized by an operating system (OS) of the storage device;
acquiring, from a state monitoring circuit that monitors a life-and-death state of the memory device, second information that indicates a correspondence relationship between a second identifier of a slot to which the memory device is attached and a state of the memory device, the second identifier being recognized by the state monitoring circuit;
generating correspondence information that indicates a correspondence relationship among the virtual identifier, the first identifier, and the second identifier based on the first information and the second information;
acquiring, during an operation of the distributed storage, third information that indicates correspondence relationship between the virtual identifier and the first identifier;
acquiring, during the operation of the distributed storage, fourth information that indicates correspondence relationship between the second identifier and the state of the memory device from the state monitoring circuit; and
updating the correspondence relationship between the first identifier and the second identifier in the correspondence information, based on a result of comparing the third information and the fourth information with the correspondence information.

* * * * *